(12) United States Patent
Shuto et al.

(10) Patent No.: US 11,683,426 B2
(45) Date of Patent: Jun. 20, 2023

(54) MEDIUM FEEDING DEVICE AND IMAGE READING APPARATUS

(71) Applicant: SEIKO EPSON CORPORATION, Tokyo (JP)

(72) Inventors: Ryoichi Shuto, Kitakyushu (JP); Yoichiro Nishimura, Kitakyushu (JP); Yuhei Hamada, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/459,424

(22) Filed: Aug. 27, 2021

(65) Prior Publication Data

US 2022/0070320 A1 Mar. 3, 2022

(30) Foreign Application Priority Data

Aug. 31, 2020 (JP) .............................. JP2020-145433

(51) Int. Cl.
*H04N 1/00* (2006.01)
*B65H 31/02* (2006.01)
(Continued)

(52) U.S. Cl.
CPC ........... *H04N 1/00559* (2013.01); *B65H 1/04* (2013.01); *B65H 5/06* (2013.01); *B65H 31/02* (2013.01);
(Continued)

(58) Field of Classification Search
CPC ...... B65H 2801/39; B65H 1/04; B65H 31/02; B65H 5/06; B65H 2801/06; B65H 2405/11151; B65H 2405/1114; B65H 3/5284; B65H 2301/4212; B65H 2405/11164; B65H 2405/1142; B65H 2511/12; B65H 11/00; B65H 2301/4213; B65H 2301/453; B65H 2402/46; B65H 2405/11425; B65H 2405/324; B65H 2511/414; B65H 2511/415; B65H 2701/1926; B65H 3/063; B65H 3/0684; B65H 3/44; B65H 31/10; B65H 31/3018; B65H 5/006; B65H 5/305; B65H 7/00; B65H 1/00; B65H 1/28; B65H 20/00;
(Continued)

(56) References Cited

U.S. PATENT DOCUMENTS

2010/0303478 A1* 12/2010 Nakajima .............. G03G 15/55
399/113
2011/0058883 A1* 3/2011 Kim ........................ B65H 1/08
400/613

(Continued)

FOREIGN PATENT DOCUMENTS

CN 108377305 A 8/2018
WO 2016056053 A1 4/2016

*Primary Examiner* — Negussie Worku
(74) *Attorney, Agent, or Firm* — Chip Law Group

(57) ABSTRACT

A medium feeding device includes: a medium mounting section onto which a medium to be fed is mounted; a feeding unit that feeds the medium mounted on the medium mounting section; and a supporting member that supports an end in a width direction of the medium mounted on the medium mounting section and that supports the medium at a higher position than the medium mounting section in a direction of loading of the medium, the width direction being a direction crossing a feed direction.

14 Claims, 22 Drawing Sheets

(51) Int. Cl.
  *B65H 1/04*     (2006.01)
  *B65H 5/06*     (2006.01)
(52) U.S. Cl.
  CPC ..... *H04N 1/00535* (2013.01); *H04N 1/00602* (2013.01); *B65H 2405/1114* (2013.01)
(58) Field of Classification Search
  CPC .... B65H 2301/42261; B65H 2301/443; B65H 2301/51214; B65H 2301/5122; B65H 2402/441; B65H 2405/11152; B65H 2405/1122; B65H 2405/1136; B65H 2405/114; B65H 2405/332; B65H 2407/21; B65H 2511/22; B65H 2553/414; B65H 2557/242; B65H 2801/03; B65H 3/06; B65H 3/0653; B65H 31/26; B65H 31/3009; B65H 31/34; B65H 5/062; B65H 7/02; B65H 7/06; B65H 7/12; B65H 7/14; B65H 1/02; B65H 1/06; B65H 15/00; B65H 2220/02; B65H 2220/11; B65H 2301/333; B65H 2301/4222; B65H 2301/422615; B65H 2301/446; B65H 2301/5121; B65H 2301/51256; B65H 2301/5144; B65H 2301/517; B65H 2402/45; B65H 2403/722; B65H 2403/724; B65H 2404/1114; B65H 2404/133; B65H 2404/5131; B65H 2404/5311; B65H 2404/6111; B65H 2404/691; B65H 2404/721; B65H 2404/733; B65H 2404/742; B65H 2405/1117; B65H 2405/112; B65H 2405/113; B65H 2405/1132; B65H 2405/1134; B65H 2405/1144; B65H 2405/1412; B65H 2405/3321; B65H 2405/3322; B65H 2406/122; B65H 2406/35; B65H 2406/3511; B65H 2406/364; B65H 2511/10; B65H 2511/17; B65H 2511/20; B65H 2511/214; B65H 2511/51; B65H 2511/515; B65H 2511/528; B65H 2513/10; B65H 2513/20; B65H 2513/40; B65H 2513/41; B65H 2513/412; B65H 2513/512; B65H 2553/26; B65H 2553/30; B65H 2553/41; B65H 2553/81; B65H 2601/255; B65H 2601/26; B65H 2601/325; B65H 2601/523; B65H 2701/11312; B65H 2701/132; B65H 2701/1829; B65H 2701/18292; B65H 2801/09; B65H 2801/15; B65H 2801/27; B65H 29/00; B65H 29/20; B65H 29/26; B65H 29/34; B65H 29/52; B65H 3/00; B65H 3/0661; B65H 3/34; B65H 3/46; B65H 3/5215; B65H 3/56; B65H 3/66; B65H 31/20; B65H 31/3027; B65H 31/36; B65H 31/38; B65H 43/00; B65H 43/02; B65H 43/04; B65H 7/04; B65H 7/08; B65H 7/10; B65H 7/18; B65H 7/20; B65H 9/002; B65H 9/101; B65H 9/18; B65H 9/20; H04N 1/00602; H04N 1/00535; H04N 1/00779; H04N 1/04; H04N 1/00559; H04N 1/00795; H04N 1/00; H04N 1/00588; H04N 1/00718; H04N 1/00777; H04N 1/00681; H04N 1/00702; H04N 1/00726; H04N 1/00729; H04N 1/00734; H04N 1/00968; H04N 1/121; H04N 1/46; H04N 1/50; H04N 1/6008; H04N 1/6094; H04N 2201/0081; H04N 1/00551; H04N 1/0057; H04N 1/00599; H04N 1/00604; H04N 1/00615; H04N 1/00628; H04N 1/0066; H04N 1/00687; H04N 1/00694; H04N 1/0071; H04N 1/00716; H04N 1/00737; H04N 1/00755; H04N 1/3263; H04N 2201/0422; G03G 15/5062; G03G 15/6517; G03G 2215/00459; G03G 15/6502; G03G 15/6514; G03G 15/6552; G03G 21/1633; G03G 21/1695; G03G 2215/00383

See application file for complete search history.

(56) References Cited

U.S. PATENT DOCUMENTS

| | | | |
|---|---|---|---|
| 2015/0036220 A1* | 2/2015 | Yamashita | G02B 3/0058 83/13 |
| 2017/0107072 A1* | 4/2017 | Nakamura | B65H 29/14 |
| 2018/0170695 A1* | 6/2018 | Kitsuki | B65H 5/062 |
| 2019/0168984 A1* | 6/2019 | Nakamura | B65H 31/14 |
| 2019/0291984 A1* | 9/2019 | Fukumasu | B65H 5/36 |
| 2020/0270090 A1* | 8/2020 | Matsumoto | B65H 31/20 |
| 2021/0078819 A1* | 3/2021 | Nakamura | B65H 29/12 |
| 2021/0349415 A1* | 11/2021 | Yonemoto | B65H 5/062 |
| 2021/0400155 A1* | 12/2021 | Fukushima | H04N 1/00567 |
| 2022/0073305 A1* | 3/2022 | Hamada | B65H 5/062 |

* cited by examiner

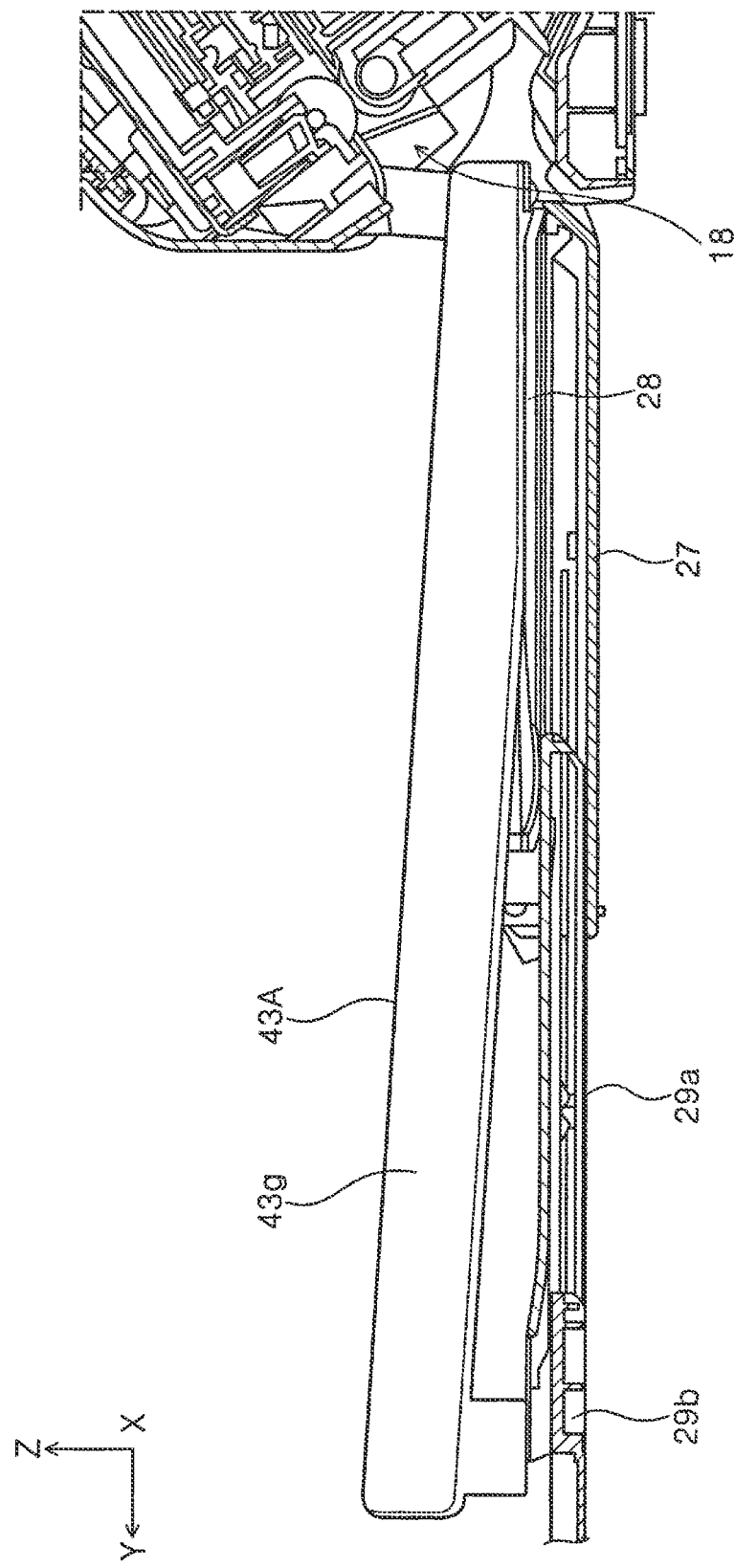

MEDIUM FEEDING DEVICE AND IMAGE READING APPARATUS

The present application is based on, and claims priority from JP Application Serial Number 2020-145433, filed Aug. 31, 2020, the disclosure of which is hereby incorporated by reference herein in its entirety.

BACKGROUND

1. Technical Field

The present disclosure relates to a medium feeding device that feeds a medium and an image reading apparatus including the same.

2. Related Art

As an example of an image reading apparatus, there is a sheet-feeding scanner that reads a document while transporting the document, and such a scanner may be configured to support, in an inclined position, a document to be fed. When a document with a fold extending along a width direction is set in such a scanner, the document may flop with the fold as a trigger and end up with failed feeding. To address such a problem, the image reading apparatus described in International Application No. 2016/056053 is provided with a retaining member configured to face a document supported in an inclined position, and prevents flopping of the document with the retaining member.

The image reading apparatus described in International Application No. 2016/056053 can prevent flopping of a document with the retaining member, but still has the following problem. That is, when a document is small in thickness and low in rigidity, the document may buckle with a fold as a trigger, sag diagonally downward in its entirety, and invite failed feeding. With the retaining member described in International Application No. 2016/056053, such a problem cannot be controlled.

SUMMARY

According to an aspect of the present disclosure, there is provided a medium feeding device including: a medium mounting section onto which a medium to be fed is mounted; a feeding unit that feeds the medium mounted on the medium mounting section; and a supporting member that supports an end in a width direction of the medium mounted on the medium mounting section and that supports the medium at a higher position than the medium mounting section in a direction of loading of the medium, the width direction being a direction crossing a feed direction.

BRIEF DESCRIPTION OF THE DRAWINGS

FIG. 22 is a view of a first ejector attachment according to another embodiment from an angle parallel with a document width direction.

DESCRIPTION OF EXEMPLARY EMBODIMENTS

Figure 1:
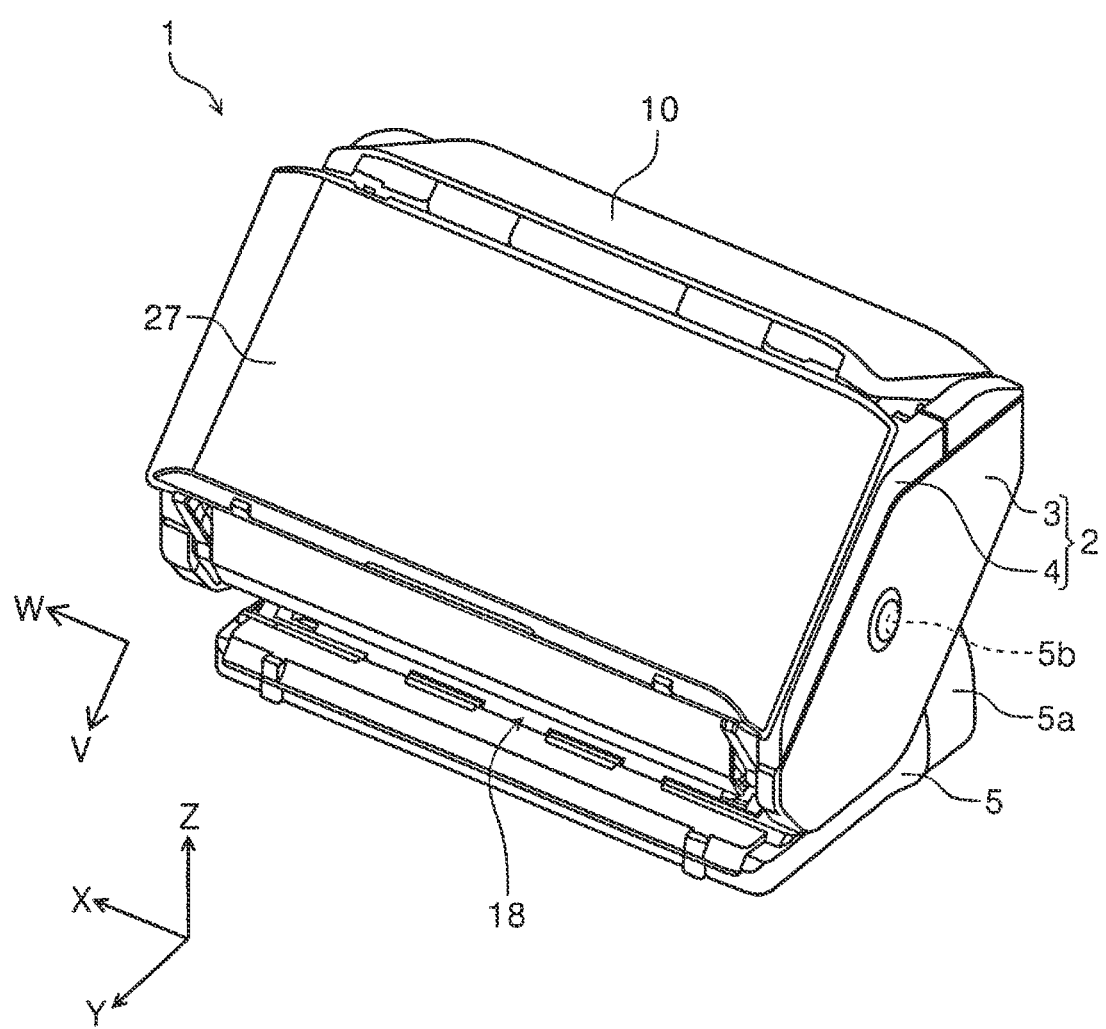
FIG. 1 is an outside perspective view of a scanner from the front.

The following schematically describes the present disclosure.

A medium feeding device according to a first aspect includes: a medium mounting section onto which a medium to be fed is mounted; a feeding unit that feeds the medium mounted on the medium mounting section; and a supporting member that supports an end in a width direction of the medium mounted on the medium mounting section and that supports the medium at a higher position than the medium mounting section in a direction of loading of the medium, the width direction being a direction crossing a feed direction.

According to the present aspect, the medium feeding device includes a supporting member that supports an end in a width direction of the medium mounted on the medium mounting section and that supports the medium at a higher position than the medium mounting section in a direction of loading of the medium, the width direction being a direction crossing a feed direction. This causes the medium to be formed into a curled shape curving out toward the medium mounting section along the width direction. This enhances the rigidity of the medium along the feed direction, and makes it possible to effectively suppress buckling of the medium along the feed direction.

A second aspect is directed to the medium feeding device according to the first aspect, wherein the supporting member is provided on both sides in the width direction.

According to the preset aspect, the supporting member is provided on both sides in the width direction. This causes the medium to be formed into a curled shape that is bilaterally symmetric along the width direction, and makes it possible to inhibit the medium from being skewed during feeding.

The following assumes that the term "curled shape" means a curled shape into which the medium is formed along the width direction.

A third aspect is directed to the medium feeding device according to the first or second aspect, wherein a supporting surface of the supporting member that supports the medium becomes higher in the direction of loading of the medium outward in the width direction.

According to the present aspect, a supporting surface of the supporting member that supports the medium becomes higher in the direction of loading of the medium outward in the width direction. This causes the medium to be formed into a naturally curled shape, and makes it possible to reduce the harmful effects of the curled shape on the feeding of the medium.

A fourth aspect is directed to the medium feeding device according to the third aspect, wherein a height of the supporting surface in the direction of loading from the medium mounting section is greater upstream than downstream in the feed direction.

According to the present aspect, a height of the supporting surface in the direction of loading from the medium mounting section is greater upstream than downstream in the feed direction. This makes it possible to appropriately form the medium into a curled shape while achieving appropriate feeding by preventing misregistration in the direction of loading with respect to the feeding unit.

A fifth aspect is directed to the medium feeding device according to the fourth aspect, further including: a feed roller constituting the feeding unit; a separating roller that nips the medium with the feed roller and that separates the medium; and a mounting surface of the medium mounting section onto which the medium is mounted, wherein when seen from an angle parallel with the width direction, a straight line parallel to the mounting surface and passing through a nip position between the feed roller and the separating roller crosses a downstream part of the supporting surface in the feed direction, and an upstream part of the supporting surface in the feed direction is at a higher position than the straight line in the direction of loading.

The present aspect makes it possible to appropriately form the medium into a curled shape while preventing misregistration of the medium in the direction of loading with respect to the nip position between the feed roller and the separating roller.

A sixth aspect is directed to the medium feeding device according to the fourth or fifth aspect, wherein the supporting member includes an edge regulating surface that regulate an edge position of the medium in the width direction, and the edge regulating surface forms a shape that tapers to a center in the width direction toward upstream of the feed direction.

When the height of the supporting surface in the direction of loading is greater upstream than downstream in the feed direction, the resulting curled shape is tighter upstream than downstream in the feed direction. This causes the edge position of the medium in the width direction to come closer to a center location in the width direction toward upstream of the feed direction. According to the present aspect, the edge regulating surface forms such a shape extending along an edge of the medium in the width direction. This makes it possible to appropriately regulate the edge of the medium in the width direction.

A seventh aspect is directed to the medium feeding device according to any of the first to sixth aspects, wherein an edge guide that regulate an edge position of the medium in the width direction is configured to move in the width direction, and the supporting member is configured to be attached to and detached from the edge guide.

According to the present aspect, an edge guide that regulates an edge position of the medium in the width direction is configured to move in the width direction, and the supporting member is configured to be attached to and detached from the edge guide. This enables the supporting member to support an end of the medium in the width direction in an appropriate position corresponding to the size of the medium in the width direction.

An eighth aspect is directed to the medium feeding device according to any of the first to seventh aspects, further including a holding section that presses the medium against the medium mounting section at a location closer to a center location of the medium than the supporting member in the width direction.

According to the present aspect, the image feeding device includes a holding section that presses the medium against the medium mounting section at a location closer to a center location of the medium than the supporting member in the width direction. This makes it possible to more surely form the medium into a curled shape.

An image reading apparatus according to a ninth aspect includes: a reading unit that reads a surface of a medium; and the medium feeding device according to any of the first to eighth aspects, the medium feeding device being configured to feed the medium toward the reading unit.

According to the present aspect, the image reading apparatus brings about the working effect of any of the aforementioned first to eighth aspects.

A tenth aspect is directed to the image reading apparatus according to the ninth aspect, further including: a medium receiving section that receives the medium ejected after being subjected to reading by the reading unit; and a receiving member that receives an end in the width direction of the medium ejected onto the medium receiving section and that receives the medium at a higher position than the medium receiving section in a direction of stacking of the medium on the medium receiving section.

According to the present aspect, the receiving member causes the medium mounted on the medium receiving section to be formed into a curled shape curving out toward the medium receiving section along the width direction. This enhances the rigidity of the medium along a direction of ejection, and makes it possible to improve the alignment of the medium on the medium receiving section.

An eleventh aspect is directed to the image reading apparatus according to the tenth aspect, wherein the receiving member is provided on both sides in the width direction.

According to the present aspect, the receiving member is provided on both sides in the width direction. This causes the medium to be formed into a curled shape that is bilaterally symmetric along the width direction, and makes it possible to inhibit the medium from being skewed during ejection.

A twelfth aspect is directed to the image reading apparatus according to the tenth or eleventh aspect, wherein a receiving surface of the receiving member that receives the medium becomes higher in the direction of stacking outward in the width direction.

According to the present aspect, a receiving surface of the receiving member that receives the medium becomes higher in the direction of stacking outward in the width direction. This causes the medium to be formed into a naturally curled shape, and makes it possible to further improve the alignment of the medium on the medium receiving section.

A thirteenth aspect is directed to the image reading apparatus according to the twelfth aspect, wherein a height of the receiving surface in the direction of stacking is greater downstream than upstream in a direction of ejection of the medium.

According to the present aspect, a height of the receiving surface in the direction of stacking is greater downstream than upstream in a direction of ejection of the medium. This makes it possible to appropriately form the medium into a curled shape while ensuring the capacity of loading of the medium by inhibiting the medium from being formed into a curled shape near an ejection port through which the medium is ejected.

A fourteenth aspect is directed to the image reading apparatus according to any of the tenth to thirteenth aspects, further including a pressing section that presses the medium against the medium receiving section at a location closer to a center location of the medium than the receiving member in the width direction.

According to the present aspect, the image reading apparatus includes a pressing section that presses the medium against the medium receiving section at a location closer to a center location of the medium than the receiving member in the width direction. This makes it possible to more surely form the medium into a curled shape.

The following describes the present disclosure in concrete terms.

The following takes, as an example of an image reading apparatus, a scanner 1 configured to read at least one of front and rear surfaces of a document serving as an example of a medium. The scanner 1 is a so-called document scanner that reads a document while moving the document with respect to a reading unit.

In an X-Y-Z coordinate system shown in each of the drawings, an X-axis direction is both an apparatus width direction and a width direction of the document. In the following, the X-axis direction is sometimes referred to as "document width direction" or simply as "width direction". A Y-axis direction is an apparatus depth direction and a direction parallel with a horizontal direction. A Z-axis direction is a direction parallel with a vertical direction. The present embodiment assumes that a +Y direction is a direction from the rear of the apparatus to the front, and a −Y direction is a direction from the front of the apparatus to the rear.

Further, a V-axis direction is a document feed direction or a document transport direction, and is a direction parallel with the after-mentioned document transport path T. A +V direction is a downstream direction along the document feed direction or the document transport direction, and a −V direction is direction toward upstream of the document feed direction or the document transport direction. In the following, feeing of the document means sending the document to a transport roller pair 16 with a feed roller 14, transport of the document means sending the document downstream with the transport roller pair 16, and ejection of the document means ejecting the document through an ejection port 18 with an ejection roller pair 17.

Further, a W-axis direction is a direction orthogonal to a mounting surface 11a of the after-mentioned document supporting tray 11 onto which the document is mounted, and a +W direction is a direction of loading of the document onto the mounting surface 11a. For convenience, some of the drawings show a V-W-X coordinate system with the V-axis direction, the W-axis direction, and the X-axis direction.

Figure 2:
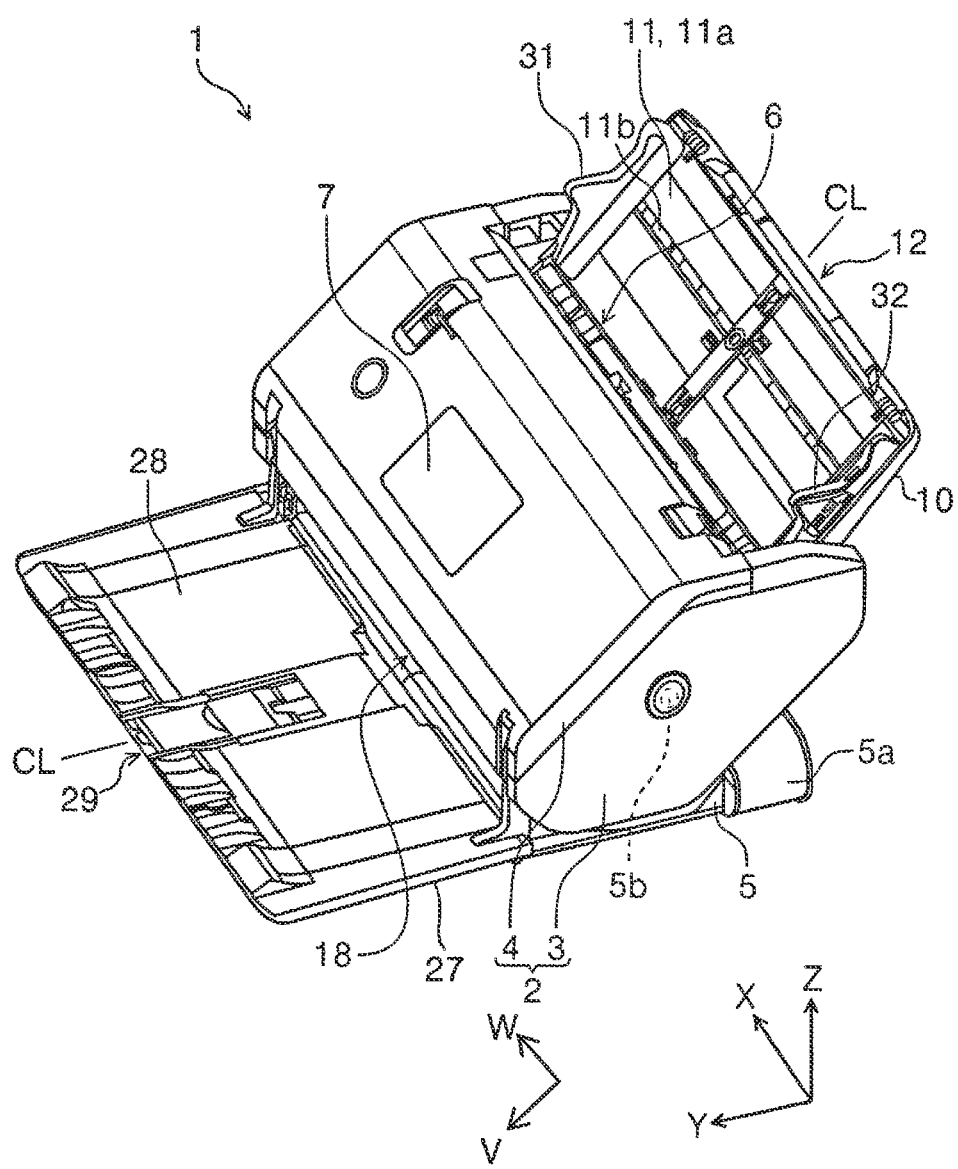
FIG. 2 is an outside perspective view of the scanner from the front with a front cover and an upper cover open.
Figure 3:
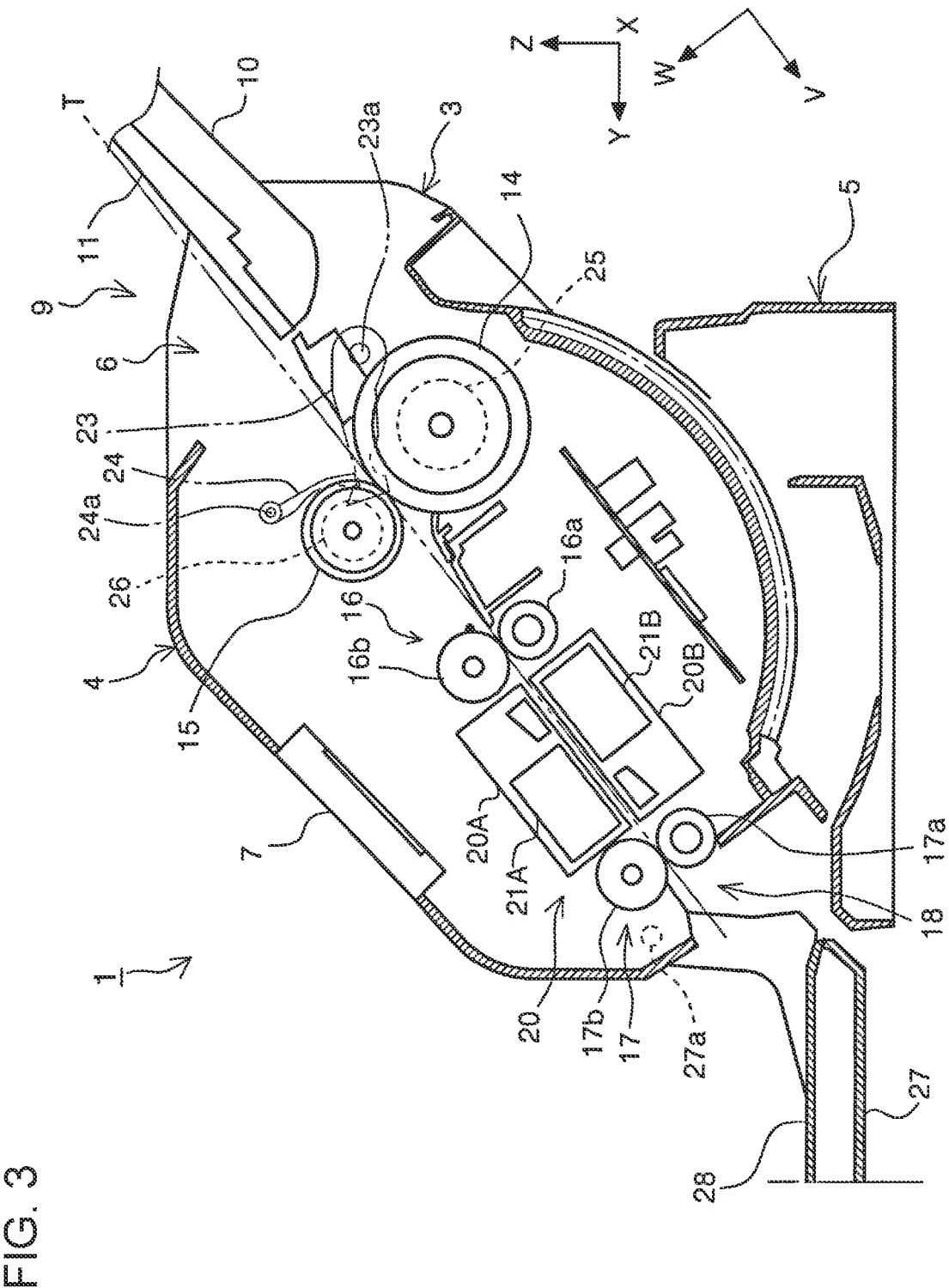
FIG. 3 is a cross-sectional view of a document transport path of the scanner from an angle parallel with a width direction.

In FIGS. 1 to 3, the scanner 1 includes an apparatus body section 2 and a supporting base 5 supporting the apparatus body section 2 so that the apparatus body section 2 can rotate.

The apparatus body section 2 includes a lower unit 3 and an upper unit 4.

The upper unit 4 is configured to be opened or closed by rotating on a rotation axis (not illustrated) with respect to the lower unit 3, and opening the upper unit 4 toward the front of the apparatus makes it possible to expose the after-mentioned document transport path T.

The lower unit 3, which constitutes the apparatus body section 2, is configured to rotate via a rotating shaft 5b with respect to an arm section 5a constituting the supporting base 5 and effect a change in position of the apparatus body section 2 by rotating.

The upper unit 4 includes a front cover 27, and the lower unit 3 includes an upper cover 10. The front cover 27 is configured to rotate on a rotating shaft 27a (see FIG. 3) with respect to the lower unit 3 and the upper unit 4, and may assume a closed state shown in FIG. 1 or an open state shown in FIG. 2 by rotating. An ejection tray 28 is provided behind the front cover 27, and opening the front cover 27 causes the ejection tray 28 to be exposed as shown in FIG. 2. The ejection tray 28 is an example of a medium receiving section that receives the document ejected after being subjected to reading.

As shown in FIG. 2, the upper unit 4 has an upper surface provided with an operation panel 7 functioning as a user interface through which to configure various reading settings, perform an operation of executing reading, or show, for example, the contents of the reading settings. In the present embodiment, the operation panel 7 is a so-called touch panel capable of both display and input, and also serves as an operation section through which to perform various operations and a display section through which to display various types of information. The operation panel 7 is exposed as shown in FIG. 2 by opening the front cover 27.

The upper cover 10, which is provided in the lower unit 3, is configured to rotate with respect to the lower unit 3, and may assume a closed state shown in FIG. 1 or an open state shown in FIGS. 2 and 3 by rotating. A document supporting tray 11, which is an example of a medium mounting section, is provided behind the upper cover 10, and opening the upper cover 10 causes the document supporting tray 11 to be exposed. The document supporting tray 11 supports, in an inclined position, a document to be fed. Reference numeral 11a denotes a mounting surface onto which the document is mounted.

Figure 4:
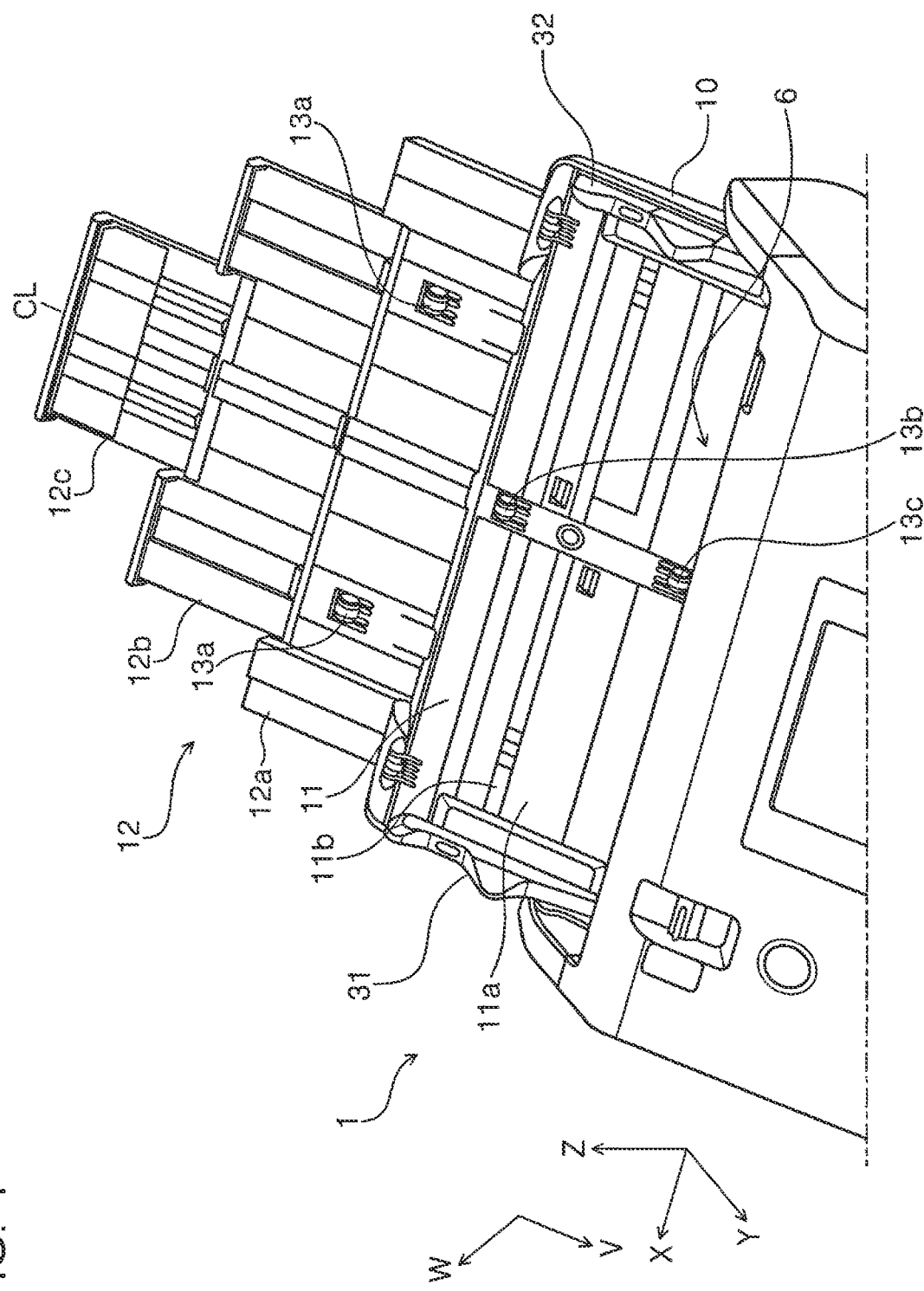
FIG. 4 is a perspective view showing a feeder expansion section expanded from a document supporting tray.

A feeder expansion section 12 is provided between the upper cover 10 and the document supporting tray 11. As shown in FIG. 4, the feeder expansion section 12 includes a first support 12a, a second support 12b, and a third support 12c that are located in this order in the −V direction in an expanded state. Further, in a stowed state, the feeder expansion section 12 is stowed between the upper cover 10 and the document support tray 11 as shown in FIG. 2 and, in this state, does not stick out from between the upper cover 10 and the document supporting tray 11. By expanding, the feeder expansion section 12 supports the document to be fed in an inclined position together with the document supporting tray 11.

In FIGS. 2 and 3, reference numeral 6 denotes a feed port 6 communicating with the interior of the apparatus body section 2. The document mounted on the document supporting tray 11 and the feeder expansion section 12 is sent into the apparatus body section 2 through the feed port 6.

The document supporting tray 11 is provided with a first edge guide 31 and a second edge guide 32 that are configured to be displaced along the X-axis direction. The first edge guide 31 regulates an edge position in a +X direction of the document mounted on the document supporting tray 11 and the feeder expansion section 12, and the second edge guide 32 regulates an edge position in a −X direction of the document mounted on the document supporting tray 11 and the feeder expansion section 12.

The first edge guide 31 and the second edge guide 32 are configured to be displaced in tandem with each other by a rack-and-pinion mechanism (not illustrated). For this reason, for example, displacing the first edge guide 31 in the −X direction causes the second edge guide 32 to be displaced in the +X direction, and displacing the first edge guide 31 in the +X direction causes the second edge guide 32 to be displaced in the −X direction. That is, the first edge guide 31 and the second edge guide 32 are displaced in such directions as to narrow the distance between the first edge guide 31 and the second edge guide 32 or displaced in such directions as to extend the distance between the first edge guide 31 and the second edge guide 32.

Moreover, the first edge guide 31 and the second edge guide 32 are displaced in such a manner as to maintain symmetrical positons with respect to a center location CL of the document supporting tray 11 in the X-axis direction. That is, the center location CL serves as a reference position for feeding, transport, and ejection of the document in the document width direction in the scanner 1.

An outward direction is herein a direction from the center location CL in the +X direction or the +X direction along the document width direction, and an inward direction is herein a direction from a location off the center location CL to the center location CL along the document width direction.

The document supporting tray 11 is provided with driven rollers 13b and 13c placed at a spacing in the document feed direction at the center location CL in the width direction. Further, the first support 12a is provided with driven rollers 13a, placed at a spacing in an axial direction, that are in symmetrical positions with respect to the center location CL. The two driven rollers 13a and the driven rollers 13b and 13c reduce forces of friction between the mounted document and the document supporting tray 11 and between the mounted document and the first support 12a.

Next, a document transport path in the scanner 1 is described with reference to FIG. 3.

The document transport path T is a substantially linear document transport path formed between the lower unit 3 and the upper unit 4.

The aforementioned document supporting tray 11 is provided most upstream in the document transport path T, and the feed roller 14, which is an example of a feeding unit that sends the mounted document in the downstream direction, and a separating roller 15 that nips the document nipped with the feed roller 14 and that separates the document are provided downstream of the document supporting tray 11. Although not illustrated, two pairs of the feed roller 14 and the separating roller 15 are provided along the width direction, and these two pairs of rollers are provided in symmetrical positions with respect to the center location CL.

The separating roller 15 is pressed against the feed roller 14 by a spring (not illustrated).

The feed roller 14 makes contact with the lowest one of documents mounted on the document supporting tray 11. Accordingly, when a plurality of documents are mounted on the document supporting tray 11, the documents are fed in the downstream direction in the order from bottom to top.

Reference numeral 24 denotes a flap that, in a feed wait state, prevents the document set on the document supporting tray 11 from making contact with the separating roller 15. The flap 24 is configured to rotate on a rotating shaft 24a, and before the start of feeding, the flap 24 has its lower end engaged in a set guide 23 and is stopped from rotating in a clockwise direction of FIG. 3. Before the start of feeding, the set guide 23 assumes a state in which the set guide 23 supports the document to keep the document out of contact with the feed roller 14.

Then, once the feeding of the document is started, the set guide 23 rotates in a counterclockwise direction of FIG. 3 on a rotating shaft 23a under the motive power of a transport motor (not illustrated), and assumes a state in which the set guide 23 brings the document into contact with the feed roller 14. This enables the flap 24 to rotate, so that the head of a bundle of documents mounted on the document supporting tray 11 comes into contact with the separating roller 15.

Torque is transmitted from a feed motor (not illustrated) to the feed roller 14 via a one-way clutch 25 in the counterclockwise direction in FIG. 3, i.e. a direction of rotation that sends the document downstream in the feed direction.

Torque is transmitted from a separating motor (not illustrated) to the separating roller 15 via a torque limiter 26 in the counterclockwise direction in FIG. 3, i.e. a direction of rotation that sends back the document upstream in the feed direction.

When no document or only one document is interposed between the feed roller 14 and the separating roller 15, the running torque with which the feed roller 14 causes the separating roller 15 to rotate in a forward direction exceeds a torque upper limit of the torque limiter 26, whereby a slippage caused in the torque limiter 26 causes the separating roller 15 to be driven to rotate in the forward direction.

When the second and subsequent documents come in between the feed roller 14 and the separating roller 15 in addition to the document to be fed, a slippage is caused between the documents, whereby the separating roller 15 rotates backward under the torque received from the separating motor (not illustrated). As a result, the second and subsequent documents to be multi fed are sent back upstream; that is, multi feeding is prevented.

The document supporting tray 11, the first edge guide 31, the second edge guide 32, the feed roller 14, and the separating roller 15, which have been described above, and a first feeder attachment 35 and a second feeder attachment 36, which will be described below, constitute a document feeding device 9 that feeds a document serving as an example of a medium. In a different standpoint, the document feeding device 9 can be regarded as a device obtained by omitting a document reading function (after-mentioned reading section 20) from the scanner 1. Alternatively, with attention focuses on the standpoint of document feeding, the scanner 1 per se can be regarded as a document feeding device, even with the inclusion of a document reading function (after-mentioned reading section 20).

Next, the transport roller pair 16 is provided downstream of the feed roller 14. The transport roller pair 16 includes a transport driving roller 16*a* that is driven by the transport motor (not illustrated) to rotate and a transport driven roller 16*b* that is driven to rotate.

A reading section 20 serving as a reading unit that reads a document image is provided downstream of the transport roller pair 16. The document is nipped by the transport roller pair 16 and transported toward the reading section 20.

The reading section 20 includes an upper sensor unit 20A that is located above the document transport path T and that is provided in the upper sensor unit 4 and a lower sensor unit 20B that is located below the document transport path T and that is provided in the lower unit 3. The upper sensor unit 20A has a sensor module 21A, and the lower sensor unit 20B has a sensor module 21B. In the present embodiment, the sensor modules 21A and 21B are contact image sensor modules (CISMs).

An upper surface of the document is read by the sensor module 21A, which is located above the document transport path T, and a lower surface of the document is read by the sensor module 21B, which is located below the document transport path T.

The ejection roller pair 17 is provided downstream of the reading section 20. After an image on at least either of the upper and lower surfaces of the document has been read by the reading section 20, the document is nipped by the ejection roller pair 17 and ejected toward the ejection tray 28 through the ejection port 18.

The ejection roller pair 17 includes an ejection driving roller 17*a* that is driven by the transport motor (not illustrated) to rotate and an ejection driven roller 17*b* that is driven to rotate.

Figure 5:
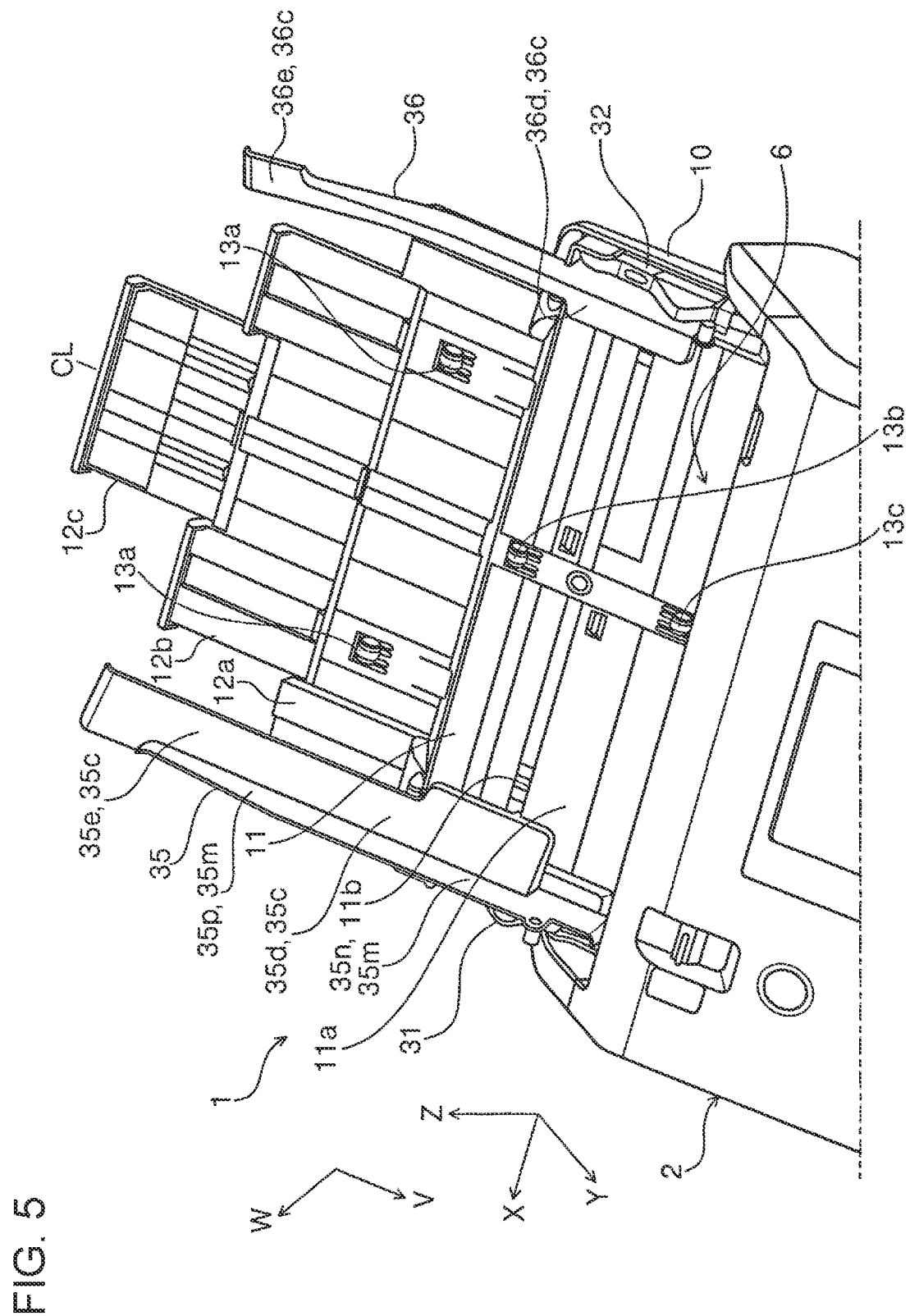
FIG. 5 is a perspective view of the document supporting tray with a first feeder attachment and a second feeder attachment fitted thereto.
Figure 6:
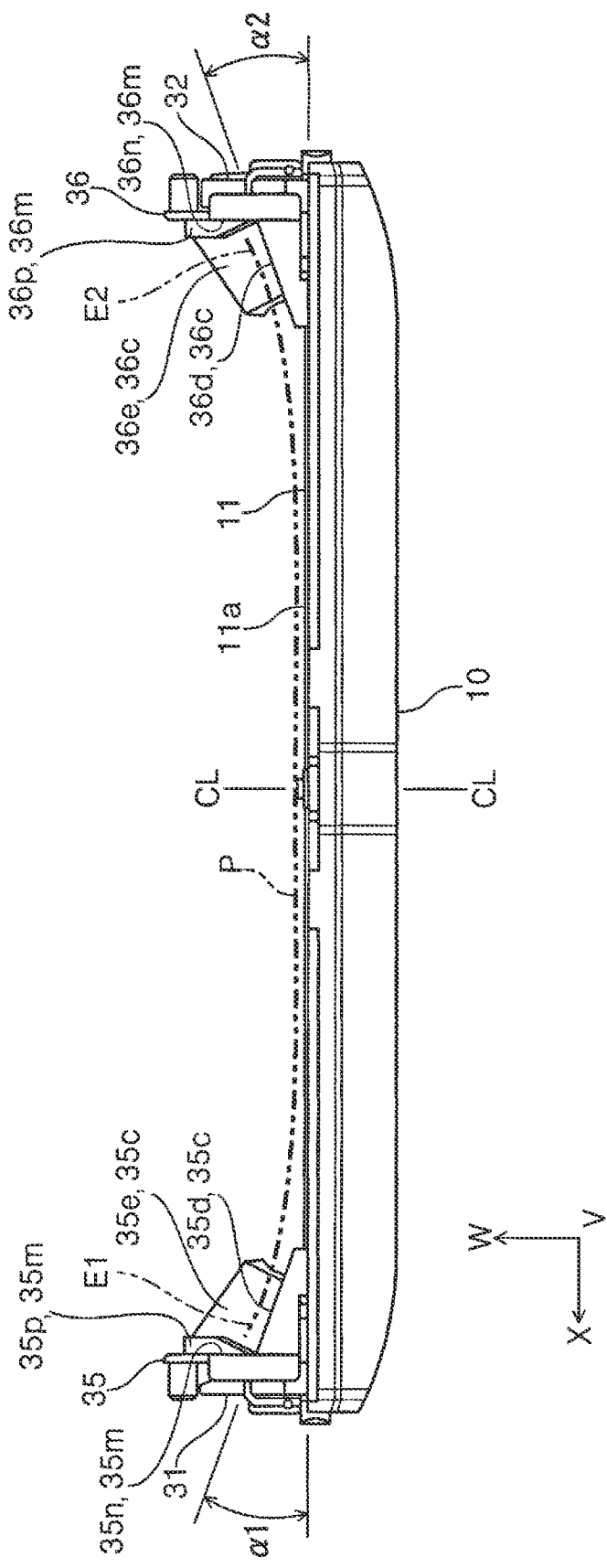
FIG. 6 is a view of the document supporting tray from downstream of a document feed direction with the first feeder attachment and the second feeder attachment fitted thereto.
Figure 7:
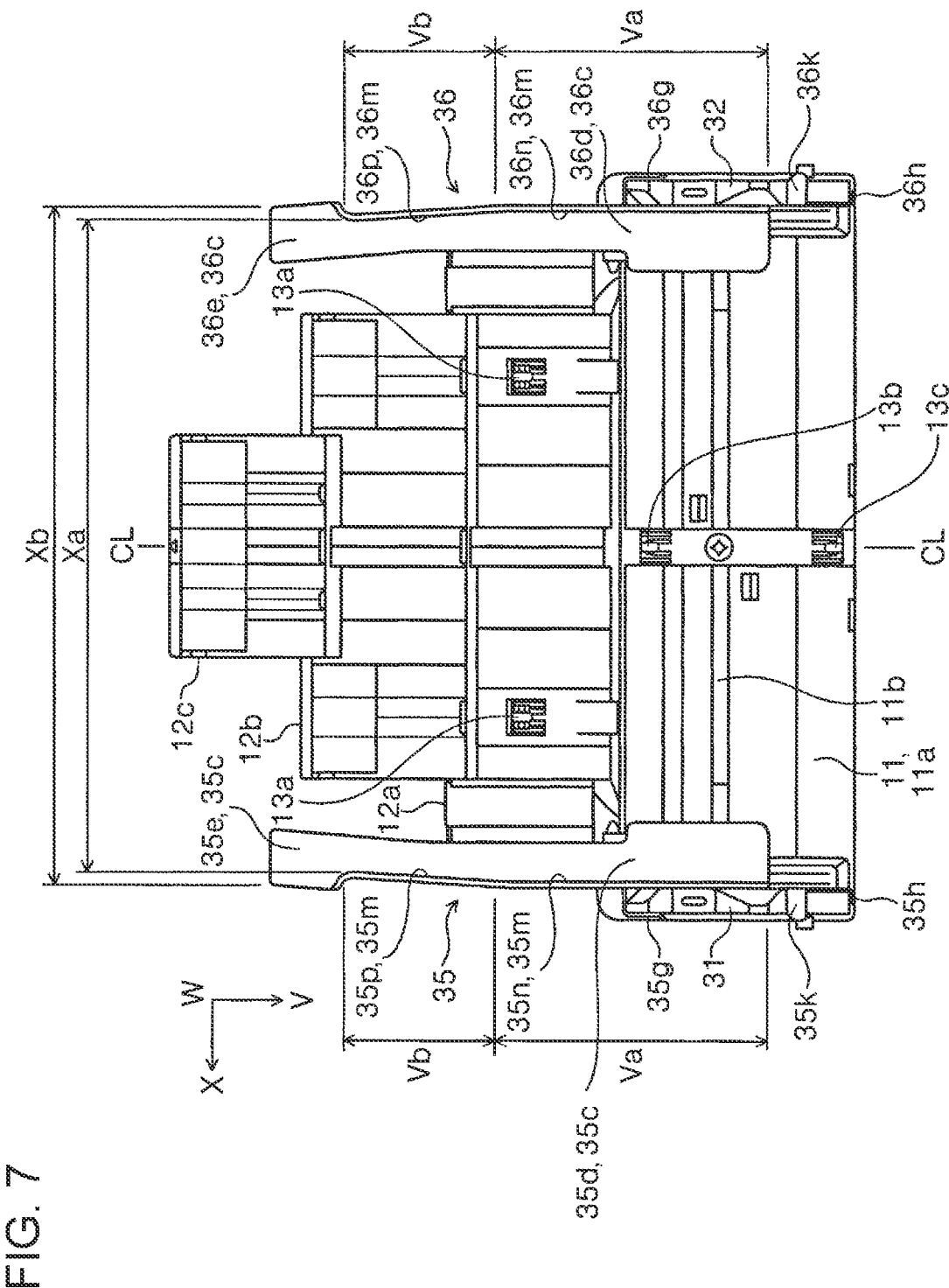
FIG. 7 is a plan view of a state in which the first feeder attachment and the second feeder attachment are fitted.

The following describes the first feeder attachment 35 and the second feeder attachment 36. In FIGS. 5 to 7, the first feeder attachment 35 and the second feeder attachment 36 are members that support, from the −W direction, ends in the width direction of the document mounted on the document supporting tray 11, and are an example of a supporting member that supports the document at a higher position than the document supporting tray 11 in the +W direction.

The first feeder attachment 35 is configured to be attached to and detached from the first edge guide 31, and the second feeder attachment 36 is configured to be attached to and detached from the second edge guide 32. That is, the first feeder attachment 35 and the second feeder attachment 36 are provided on both sides, respectively, in the document width direction.

The first feeder attachment 35 and the second edge guide 32 are formed in shapes that are bilaterally symmetric with respect to the center location CL.

The first feeder attachment 35 includes a first supporting surface 35*c* that supports an end E1 (see FIG. 6) in the +X direction of the document from the −W direction. The first supporting surface 35*c* is constituted by a downstream supporting surface 35*d*, which is a part of the first supporting surface 35*c* situated downstream in the document feed direction, and an upstream supporting surface 35*e*, which is a part of the first supporting surface 35*c* situated upstream in the document feed direction. The end E1 is a part of the document including an edge of the document in the +X direction and having a predetermined width in the document width direction, and is a part of the document that is supported by the first supporting surface 35*c*. In FIG. 6, the chain double-dashed line and reference numeral P denote the document being supported.

Similarly, the second feeder attachment 36 includes a second supporting surface 36*c* that supports an end E2 (see FIG. 6) in the +X direction of the document from the −W direction. The second supporting surface 36*c* is constituted by a downstream supporting surface 36*d*, which is a part of the second supporting surface 36*c* situated downstream in the document feed direction, and an upstream supporting surface 36*e*, which is a part of the second supporting surface 36*c* situated upstream in the document feed direction. The end E2 is a part of the document including an edge of the document in the −X direction and having a predetermined width in the document width direction, and is a part of the document that is supported by the second supporting surface 36*c*.

Figure 8:
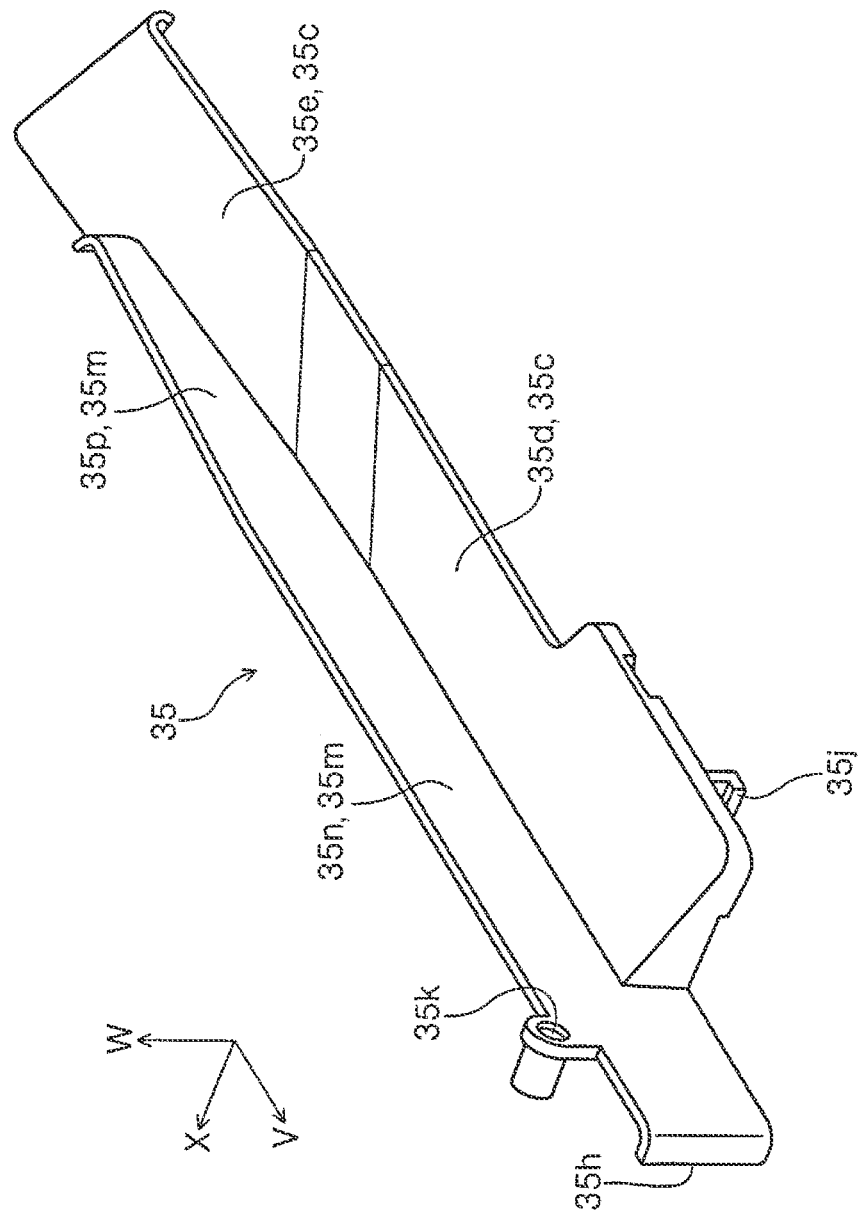
FIG. 8 is a perspective view of the first feeder attachment.

The downstream supporting surfaces 35*d* and 36*d* are formed substantially in an area Va of FIG. 7 in the document feed direction, and the upstream supporting surfaces 35*e* and 36*e* are formed substantially in an area Vb of FIG. 7 in the document feed direction. The downstream and upstream supporting surfaces 35*d* and 35*e* of the first feeder attachment 35 are coupled together as shown in FIG. 8 to form one first supporting surface 35*c*. Similarly, the downstream and upstream supporting surfaces 36*d* and 36*e* of the second feeder attachment 36 are coupled together (although not illustrated) to form one second supporting surface 36*c*.

The downstream and upstream supporting surfaces 35*d* and 35*e* of the first feeder attachment 35 are formed as inclined surfaces that become higher in the +W direction, i.e. a document loading direction, outward in the width direction as shown in FIG. 6, and an angle denoted by reference numeral α1 in FIG. 6 is an angle of inclination of the downstream supporting surface 35*d* with respect to the mounting surface 11*a*. The angle of inclination α1 of the downstream supporting surface 35*d* is constant in the area Va in the document feed direction.

On the other hand, the angle of inclination of the upstream supporting surface 35*e* with respect to the mounting surface 11*a* is formed to vary in the document feed direction and, specifically, is formed so that the angle of inclination with respect to the mounting surface 11*a* becomes greater toward upstream of the feed direction. That is, the height of the upstream supporting surface 35*e* above the mounting surface 11*a* in the +W direction is greater upstream than downstream in the document feed direction.

Similarly, the downstream and upstream supporting surfaces 36*d* and 36*e* of the second feeder attachment 36 are formed as inclined surfaces that become higher in the +W direction, i.e. the document loading direction, outward in the width direction as shown in FIG. 6, and an angle denoted by reference numeral α2 in FIG. 6 is an angle of inclination of the downstream supporting surface 36*d* with respect to the mounting surface 11*a*. The angle of inclination α2 of the downstream supporting surface 36*d* is constant in the area Va in the document feed direction. It should be noted that the angle of inclination α1 of the downstream supporting surface 35*d* of the first feeder attachment 35 and the angle of inclination α2 of the downstream supporting surface 36*d* of the second feeder attachment 36 are set to be the same.

On the other hand, the angle of inclination of the upstream supporting surface 36*e* with respect to the mounting surface 11*a* is formed to vary in the document feed direction and, specifically, is formed so that the angle of inclination with respect to the mounting surface 11*a* becomes greater toward upstream of the feed direction. That is, the height of the upstream supporting surface 36*e* above the mounting surface 11*a* in the +W direction is greater upstream than downstream in the document feed direction. It should be noted that the angle of inclination of the upstream supporting surface 35*e* of the first feeder attachment 35 and the angle of inclination of the upstream supporting surface 36*e* of the second feeder attachment 36 are set to be the same.

Next, the first feeder attachment 35 includes a first edge regulating surface 35*m* that regulates an edge position of the document in the +X direction. The first edge regulating surface 35*m* is constituted by a downstream edge regulating surface 35*n*, which is a part of the first edge regulating surface 35*m* situated downstream in the document feed direction, and an upstream edge regulating surface 35*p*, which is a part of the first edge regulating surface 35*m* situated upstream in the document feed direction.

Further, the second feeder attachment 36 includes a second edge regulating surface 36*m* that regulates an edge position of the document in the −X direction. The second edge regulating surface 36*m* is constituted by a downstream edge regulating surface 36*n*, which is a part of the second edge regulating surface 36*m* situated downstream in the document feed direction, and an upstream edge regulating surface 36*p*, which is a part of the second edge regulating surface 36*m* situated upstream in the document feed direction.

The downstream edge regulating surfaces 35*n* and 36*n* are formed substantially in the area Va of FIG. 7, and the upstream edge regulating surfaces 35*p* and 36*p* are formed substantially in the area Vb of FIG. 7.

The downstream and upstream edge regulating surfaces 35*n* and 35*p* of the first feeder attachment 35 are coupled together as shown in FIG. 7 to form one first edge regulating surface 35*m*. Similarly, the downstream and upstream edge regulating surfaces 36*n* and 36*p* of the second feeder attachment 36 are coupled together as shown in FIG. 7 to form one second edge regulating surface 36*m*.

The upstream edge regulating surface 35*p* of the first feeder attachment 35 and the upstream edge regulating surface 36*p* of the second feeder attachment 36 form a shape that tapers to the center location CL in the width direction toward upstream of the document feed direction. As a result, the spacing in the width direction between the upstream edge regulating surface 35*p* of the first feeder attachment 35 and the upstream edge regulating surface 36*p* of the second feeder attachment 36 becomes narrower toward upstream of the document feed direction.

The spacing Xa shown in FIG. 7 is the spacing between the downstream edge regulating surface 35*n* of the first feeder attachment 35 and the downstream edge regulating surface 36*n* of the second feeder attachment 36, and is the spacing between a downstream end of the upstream edge regulating surface 35*p* of the first feeder attachment 35 and a downstream end of the upstream edge regulating surface 36*p* of the second feeder attachment 36. Moreover, the spacing Xb is the spacing between an upstream end of the upstream edge regulating surface 35*p* of the first feeder attachment 35 and an upstream end of the upstream edge regulating surface 36*p* of the second feeder attachment 36. As illustrated, the spacing Xa is narrower than the spacing Xb.

Figure 9:
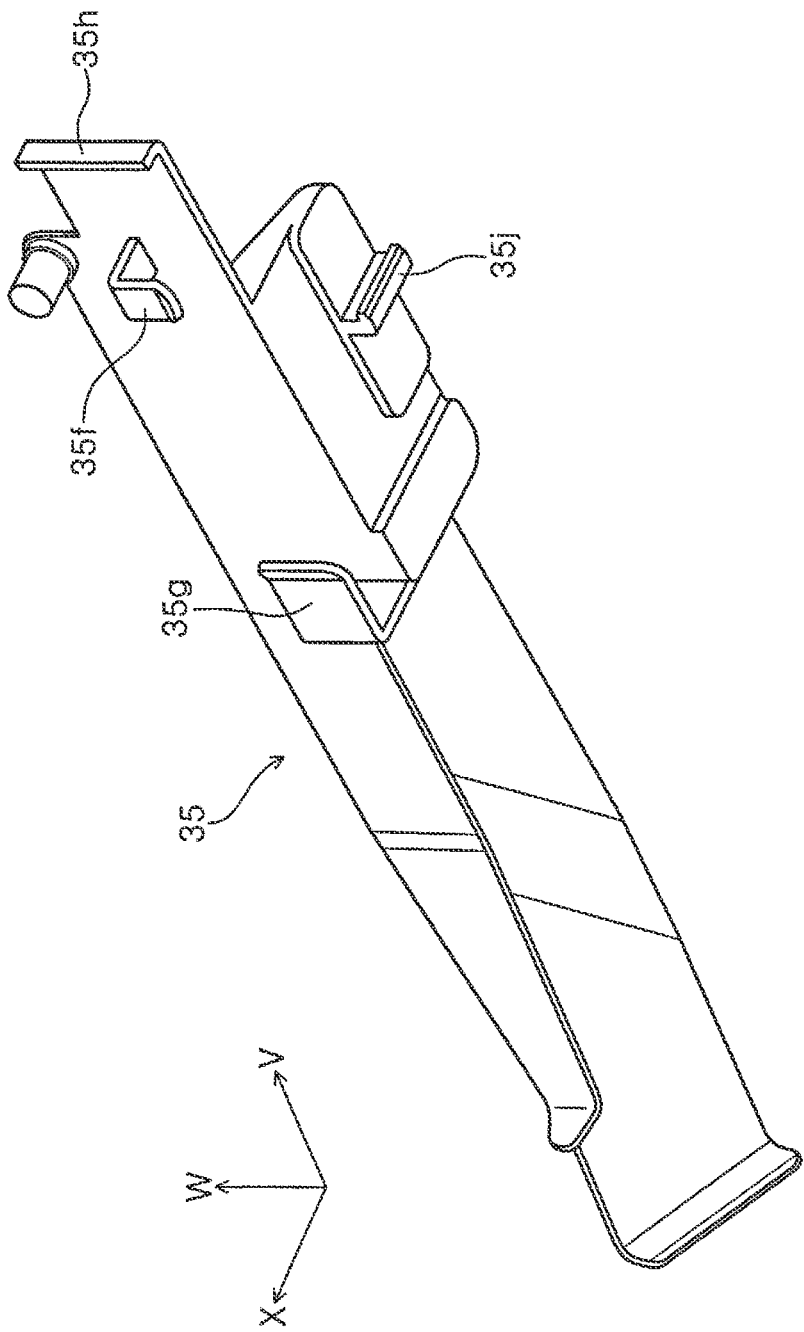
FIG. 9 is a perspective view of the first feeder attachment.
Figure 10:
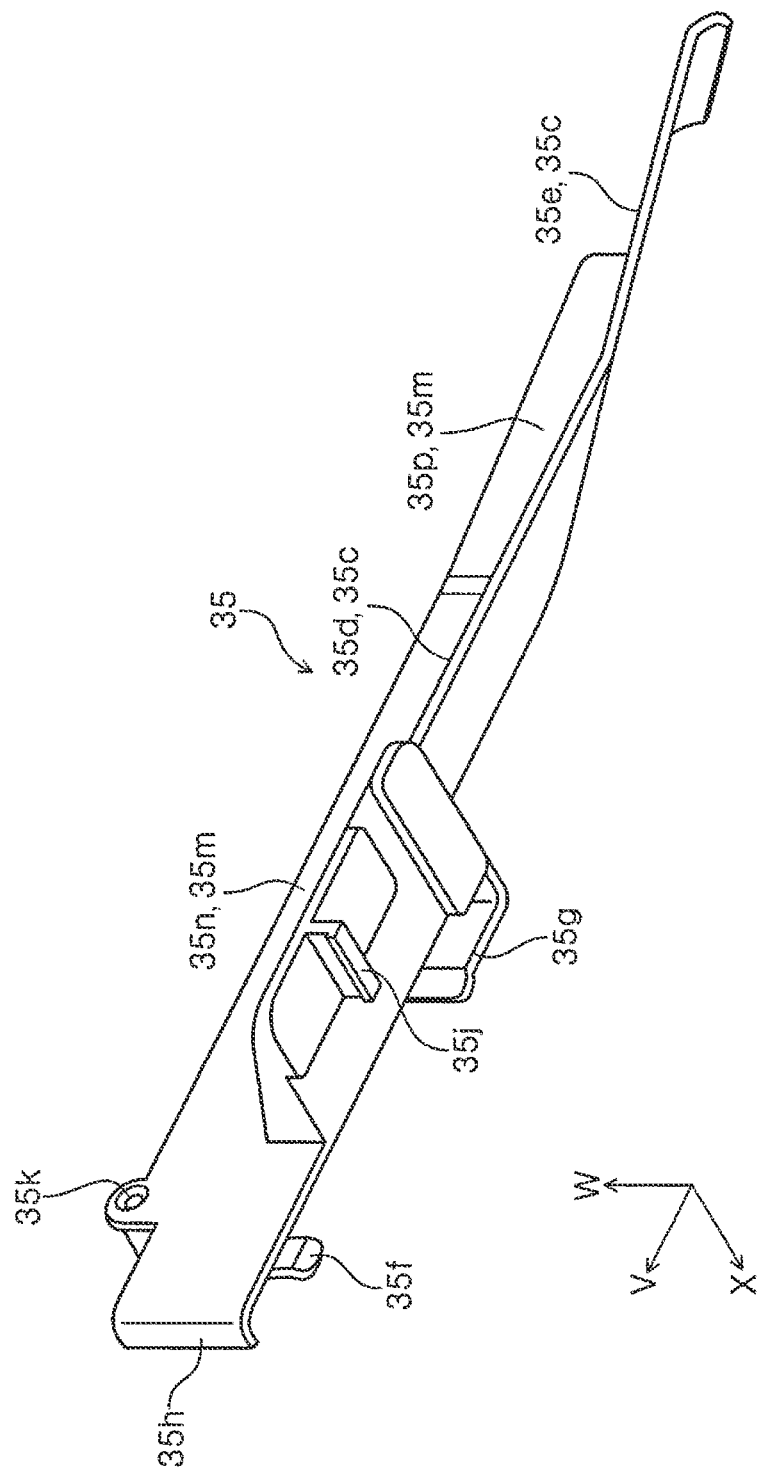
FIG. 10 is a perspective view of the first feeder attachment.

The following further describes the shape of the first feeder attachment 35 with reference to FIGS. 8 to 10. It should be noted that the following omits to describe the shape of the second feeder attachment 36 in detail, as the shape of the second feeder attachment 36 is basically the same as the shape of the first feeder attachment 35 except that the shape of the second feeder attachment 36 is symmetric with the shape of the first feeder attachment 35 in the document width direction.

Figure 11:
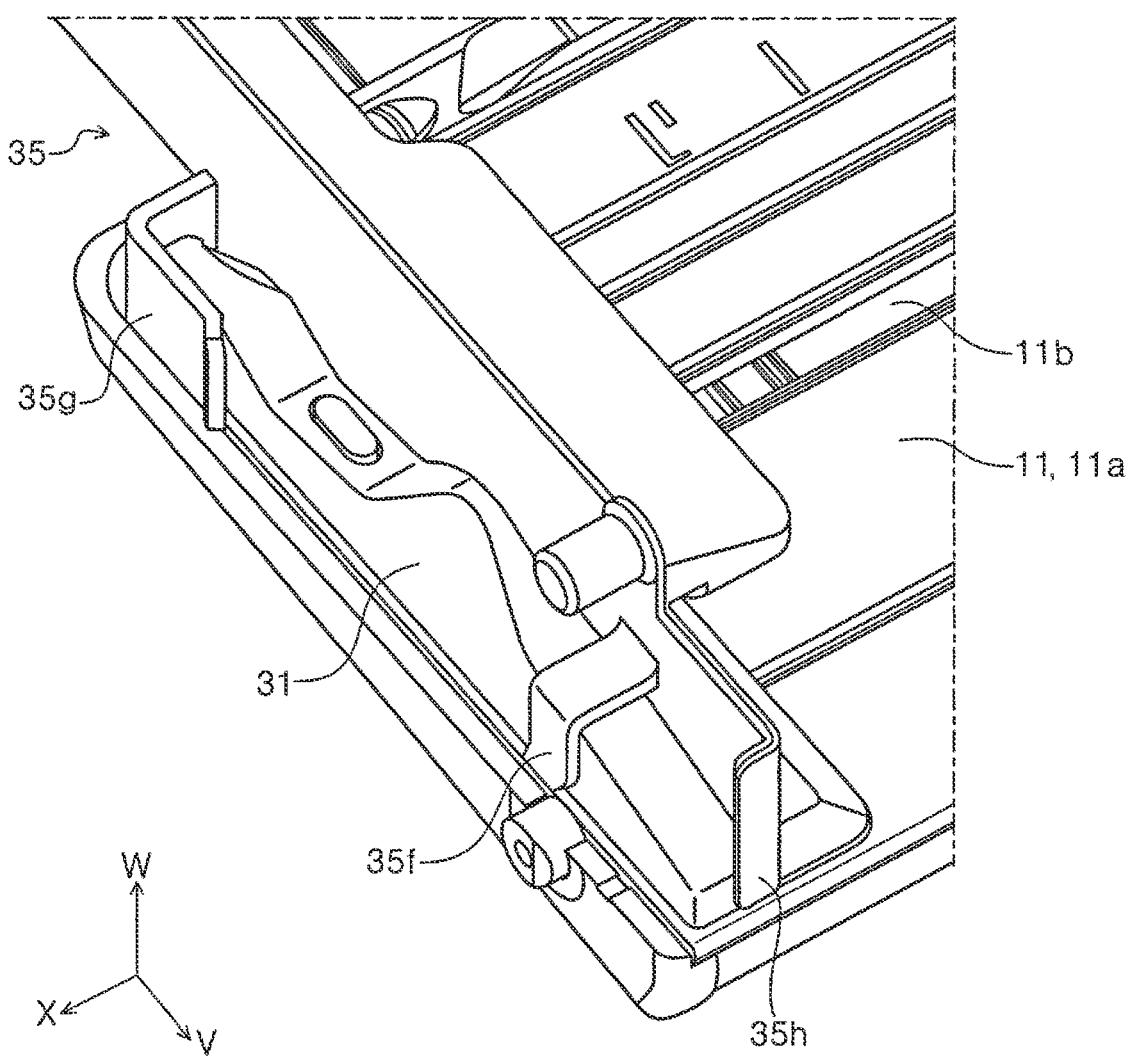
FIG. 11 is a perspective view showing a state in which the first feeder attachment is fitted to a first edge guide.

The first feeder attachment 35 has a first retainer 35*f* and a second retainer 35*g* on a side surface thereof facing in the +X direction, i.e. outward. As shown in FIG. 11, the first retainer 35*f* forms such a shape as to cover the first edge guide 31 from the +W direction when fitted to the first edge guide 31. Further, the second retainer 35*g* forms such a shape as to cover a −V direction end of the first edge guide 31 from the −V direction when fitted to the first edge guide 31.

Further, the first feeder attachment 35 has, at a +V direction end thereof, a third retainer 35*h* forming a shape that sticks out outward. The third retainer 35*h* forms such a shape as to hook on to a +V direction end of the first edge guide 31 when fitted to the first edge guide 31. The first retainer 35*f* and the second retainer 35*g* determine the position of the first feeder attachment 35 in the width direction with respect to the first edge guide 31. Further, the second retainer 35*g* and the third retainer 35*h* determine the position of the first feeder attachment 35 in the document feed direction with respect to the first edge guide 31.

Figure 12:
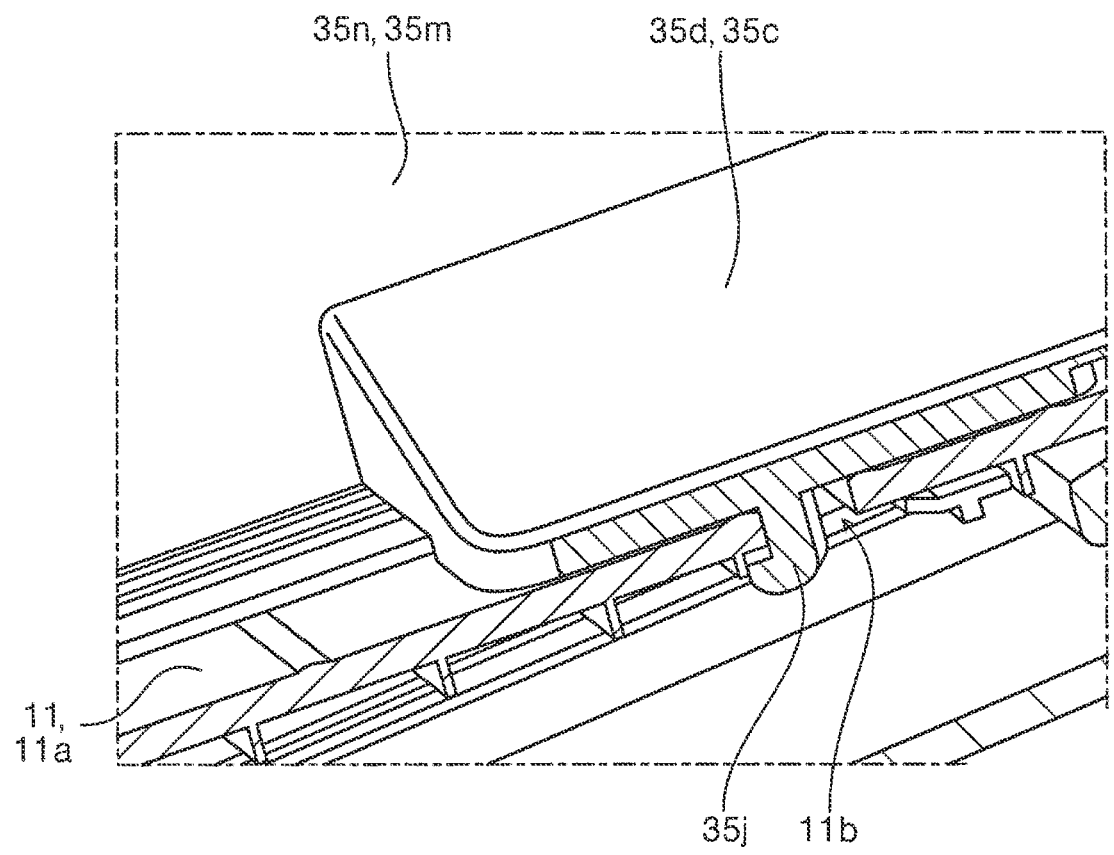
FIG. 12 is a cross-sectional perspective view of a part of the first feeder attachment that engages with the document supporting tray.

The first feeder attachment 35 has, on a bottom surface thereof in the −W direction, a hook 35*j* extending in the document width direction. Meanwhile, the document supporting tray 11 has a groove portion 11*b* (see FIG. 5) formed therein along the document width direction, and when the first feeder attachment 35 is fitted to the first edge guide 31, the hook 35*j* slots into the groove portion 11*b* as shown in FIG. 12 and the hook 35*j* hooks on to a surface of the document supporting tray 11 in the −W direction. This determines the position of the first feeder attachment 35 in the W-axis direction with respect to the first edge guide 31.

As noted above, the ends in the width direction of the document mounted on the document supporting tray 11 are supported from the −W direction as shown in FIG. 6 by the first feeder attachment 35 and the second feeder attachment 36. This causes the document to be formed into a curled shape curving out toward the document supporting tray 11 along the width direction as shown in FIG. 6. This enhances the rigidity of the document along the feed direction, and makes it possible to effectively suppress buckling of the set document along the document feed direction. This makes it possible to reduce failed feeding.

Further, the feeder attachments are provided on both sides, respectively, in the document width direction. This causes the document to be formed into a curled shape that is bilaterally symmetric along the document width direction, and makes it possible to inhibit the document from being skewed during feeding.

Even a configuration in which only either the first feeder attachment 35 or the second feeder attachment 36 is provided makes it possible to form the document into a curled shape and enhance the rigidity of the document along the feed direction.

Further, the first supporting surface 35*c* of the first feeder attachment 35 and the second supporting surface 36*c* of the second feeder attachment 36 are both become higher in the +W direction, i.e. the document loading direction, outward in the document width direction. This causes the document to be formed into a naturally curled shape, and makes it possible to reduce the harmful effects of the curled shape on feeding of the document.

Further, the heights of the upstream supporting surface 35*e* of the first feeder attachment 35 and the upstream supporting surface 36*e* of the second feeder attachment 36 above the mounting surface 11*a* in the +W direction, i.e. the document loading direction, are greater upstream than downstream in the document feed direction. This makes it possible to form the document into a curled shape while achieving appropriate feeding by preventing misregistration in the +W direction with respect to the feed roller 14.

Figure 13:
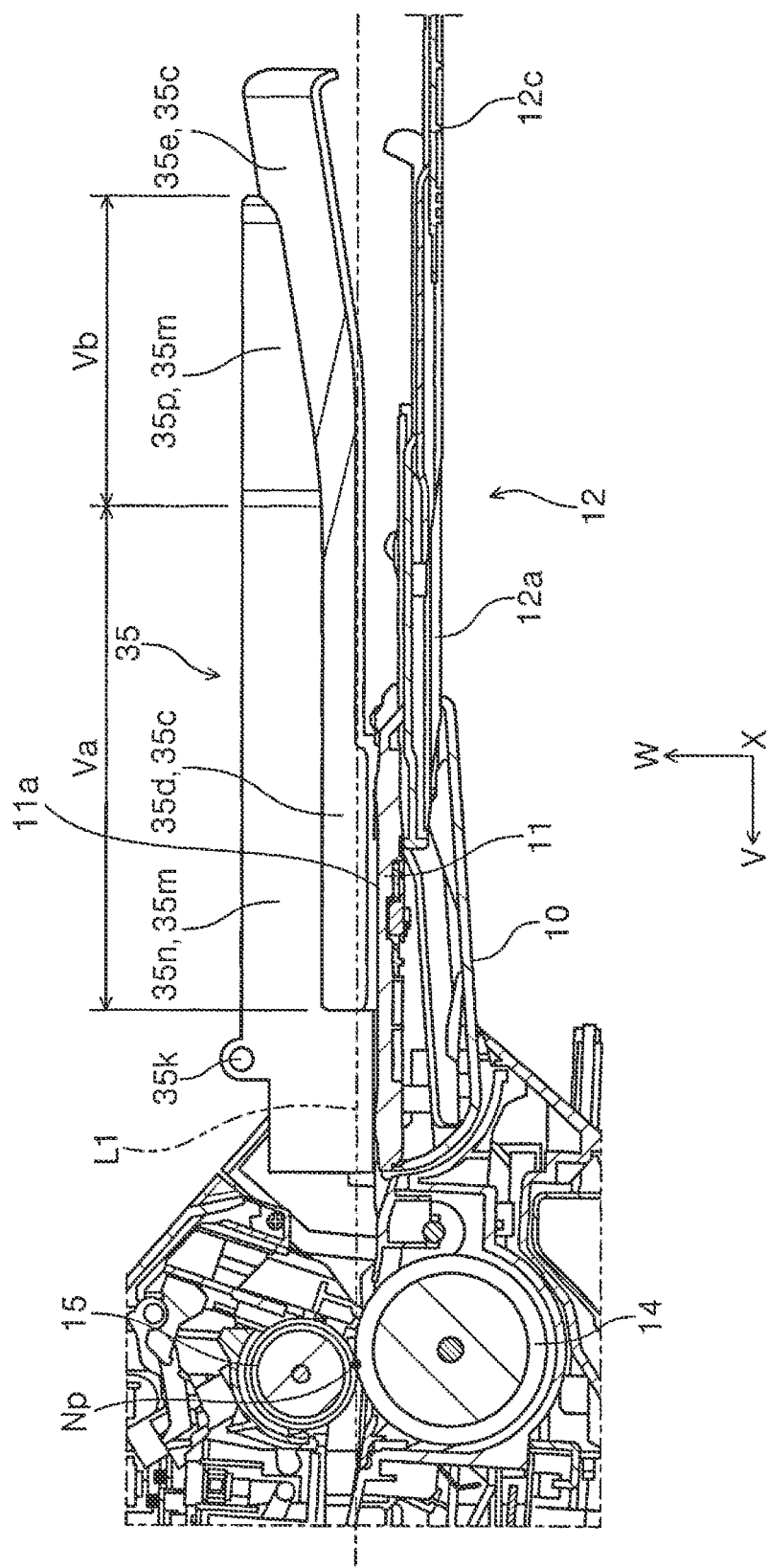
FIG. 13 is a side cross-sectional view of the document supporting tray and the feeder expansion section.

More specifically, when seen from an angle parallel with the document width direction as shown in FIG. 13, a straight line L1 parallel to the mounting surface 11a and passing through a position N1, which is a nip position between the feed roller 14 and the separating roller 15, crosses the downstream supporting surface 35d. Moreover, the upstream supporting surface 35e is at a higher position than the straight line L1 in the +W direction. Such a configuration makes it possible to appropriately form the document into a curled shape while preventing misregistration of the document in the +W direction with respect to the position N1.

Further, when the heights of the upstream supporting surface 35e of the first feeder attachment 35 and the upstream supporting surface 36e of the second feeder attachment 36 in the +W direction, i.e. the document loading direction, are greater upstream than downstream in the document feed direction, the resulting curled shape is tighter upstream than downstream. This causes edge positions of the document in the width direction to come closer to the center location CL in the width direction toward upstream of the document feed direction. In the present embodiment, the upstream edge regulating surfaces 35p and 36p form such shapes extending along the edges of the document in the width direction This makes it possible to regulate the edges of the document in the width direction.

Further, in the present embodiment, the first feeder attachment 35 is configured to be attached to and detached from the first edge guide 31, and the second feeder attachment 36 is configured to be attached to and detached from the second edge guide 32. This enables each feeder attachment to support an end of the document in the width direction in an appropriate position corresponding to the size of the document in the width direction.

In addition, removing the first feeder attachment 35 and the second feeder attachment 36 makes it possible to bring the upper cover 10 into an appropriately closed state as shown in FIG. 1.

Figure 14:
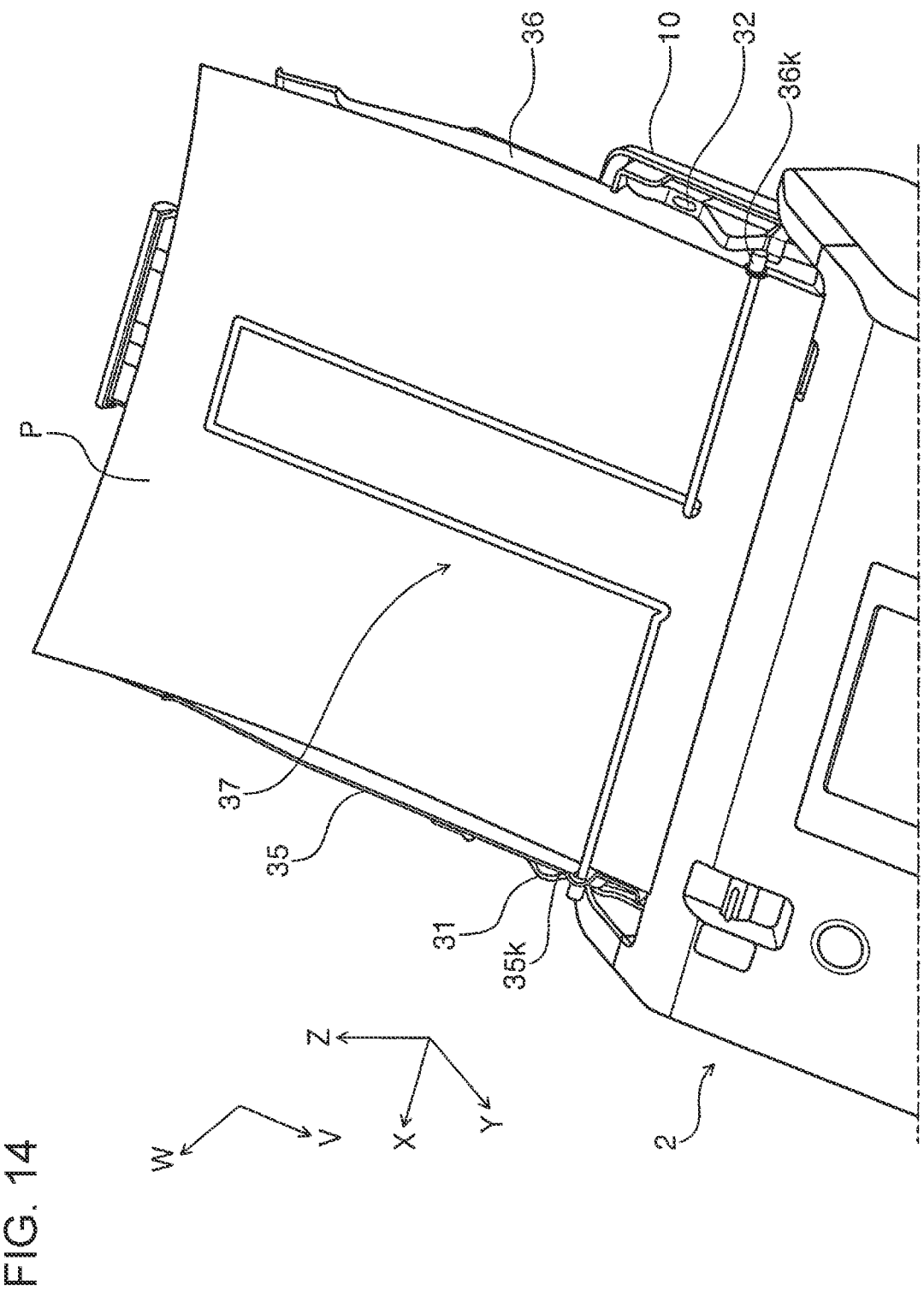
FIG. 14 is a perspective view showing a state in which a holding section is fitted to the first feeder attachment and the second feeder attachment.

As shown in FIGS. 7 and 8, the first feeder attachment 35 has a shaft supporter 35k, and as shown in FIG. 7, the second feeder attachment 36 has a shaft supporter 36k, too. As shown in FIG. 14, the shaft supporters 35k and 36k can be provided with a holding section 37. The holding section 37 of FIG. 14 is formed by bending a metal wire member, and can rotate within a V-W plane by being supported by the shaft supporters 35k and 36k. By rotating, the holding section 37 can switch between a pressing state in which the holding section 37 presses the set document against the document supporting tray 11 under its own weight as shown in FIG. 14 and a clear state (not illustrated) in which the holding section 37 is clear of the set document.

The holding section 37 presses the document against the document supporting tray 11 at a location closer to a center location of the document than the first feeder attachment 35 and the second feeder attachment 36 in the document width direction. This makes it possible to more surely form the document into a curled shape.

Although, in the present embodiment, the holding section 37 is configured to rotate with respect to the first feeder attachment 35 and the second feeder attachment 36, the holding section 37 may be configured to rotate with respect to the first edge guide 31 and the second edge guide 32 or the apparatus body section 2. Further, it is preferable that the holding section 37 be shaped in conformance with an upper surface of the apparatus body section 2 so that when the holding section 37 assumes the clear state in which the holding section 37 is clear of the set document, the upper cover 10 and the front cover 27 (see FIG. 1) can be appropriately closed.

Figure 15:
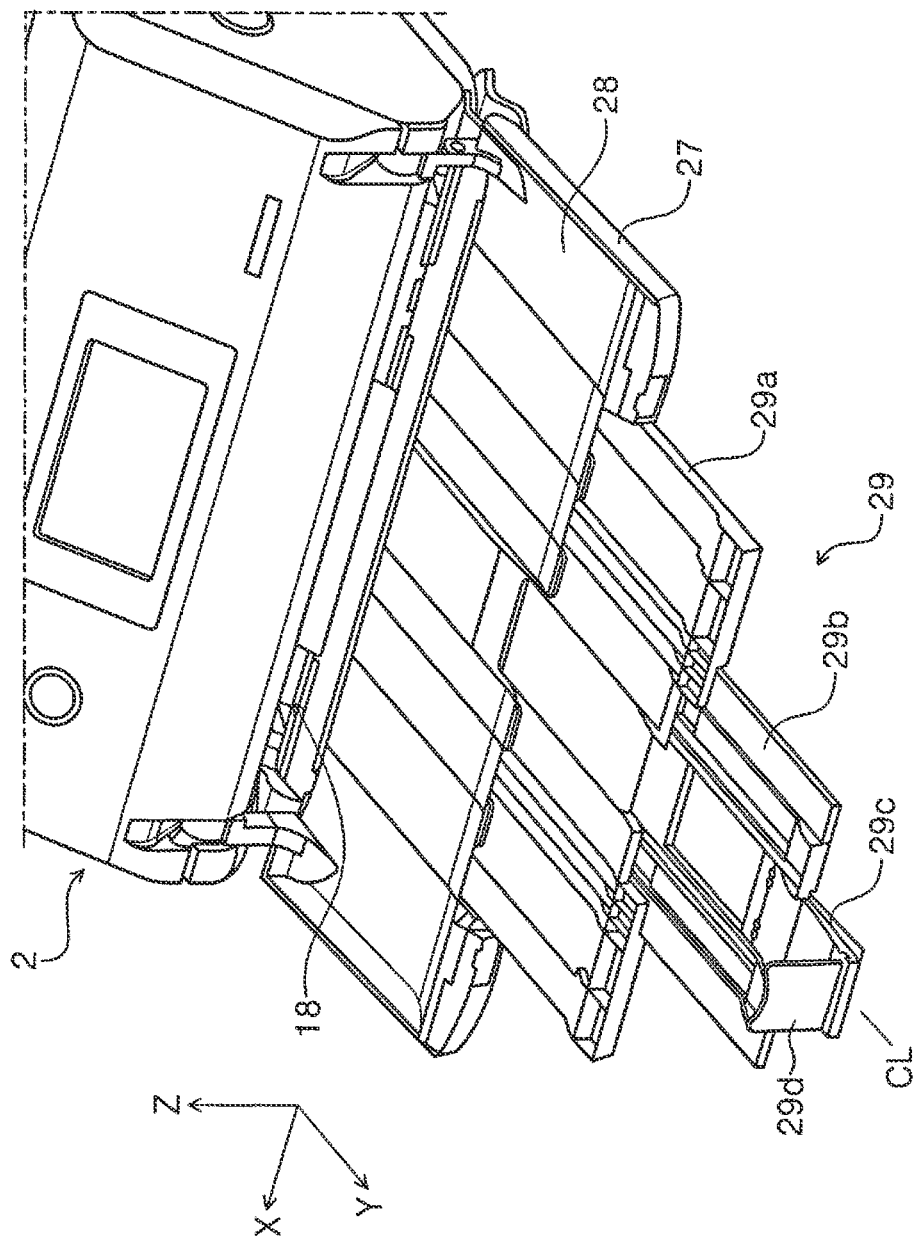
FIG. 15 is a perspective view showing a state in which an ejector expansion section is expanded from an ejection tray.

The following describes, with reference to FIG. 15 and the subsequent drawings, a first ejector attachment 43 and a second ejector attachment 44 with which the ejection tray 28 and an ejector expansion section 29 are provided. As shown in FIG. 15, the ejector expansion section 29 is provided between the front cover 27 and the ejection tray 28. The ejector expansion section 29 includes a first expansion section 29a, a second expansion section 29b, a third expansion section 29c, and a fourth expansion section 29d that are located in this order in the +Y direction in an expanded state. Further, in a stowed state, the ejector expansion section 29 is stowed between the front cover 27 and the ejection tray 28 as shown in FIG. 2 and, in this state, does not stick out from between the front cover 27 and the ejection tray 28. By expanding, the ejector expansion section 29 supports the ejected document together with the ejection tray 28.

Figure 16:
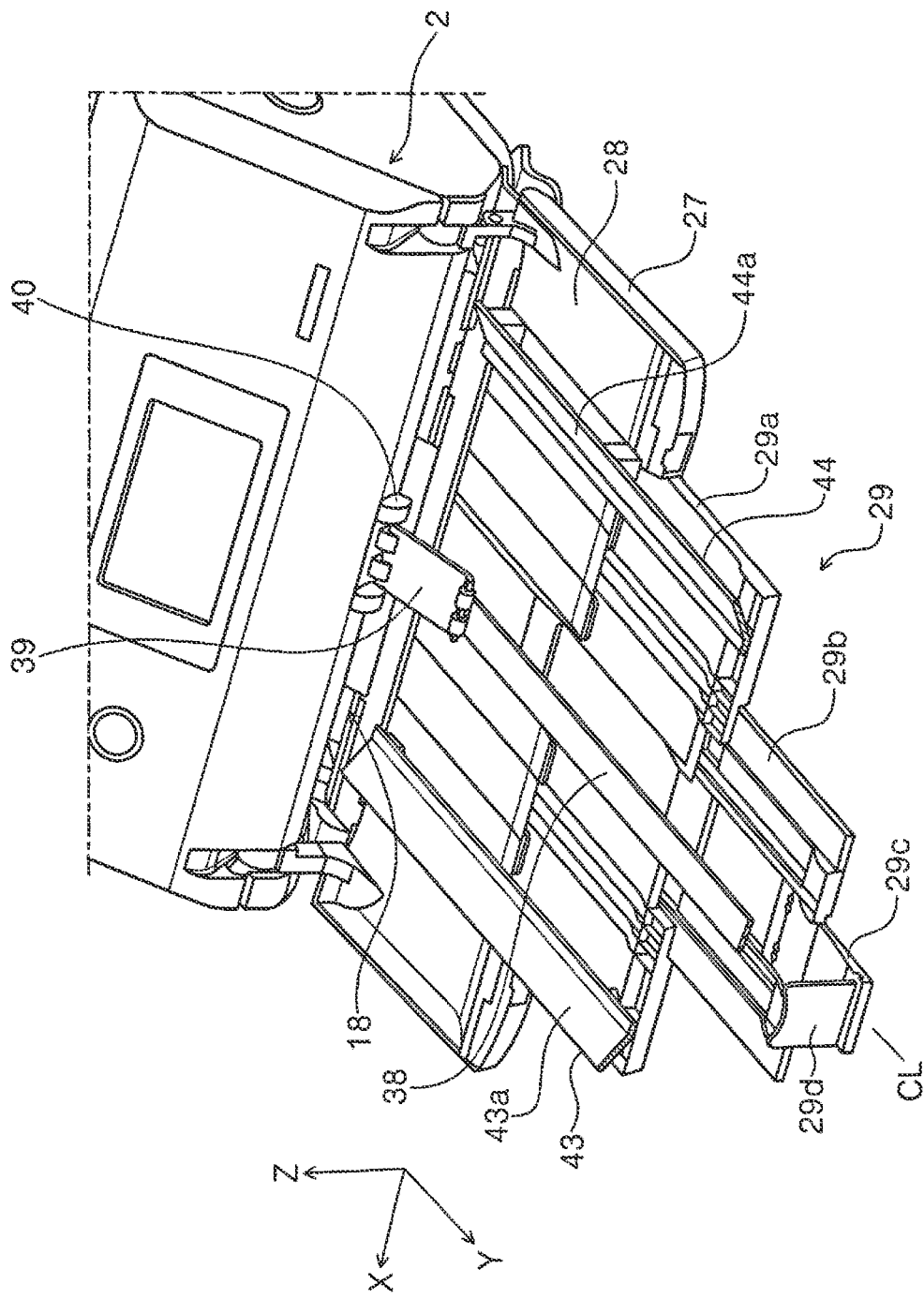
FIG. 16 is a perspective view of the ejection tray with a first ejector attachment and a second ejector attachment fitted thereto.

As shown in FIG. 16, the ejection tray 28 and the ejector expansion section 29 are provided with the first ejector attachment 43 and the second ejector attachment 44. The first ejector attachment 43 and the second ejector attachment 44 are an example of a receiving member that receives ends of the ejected document in the width direction and that receives the document at a higher position than the ejection tray 28 in the +Z direction, i.e. a direction of stacking of the document on the ejection tray 28.

Figure 17:
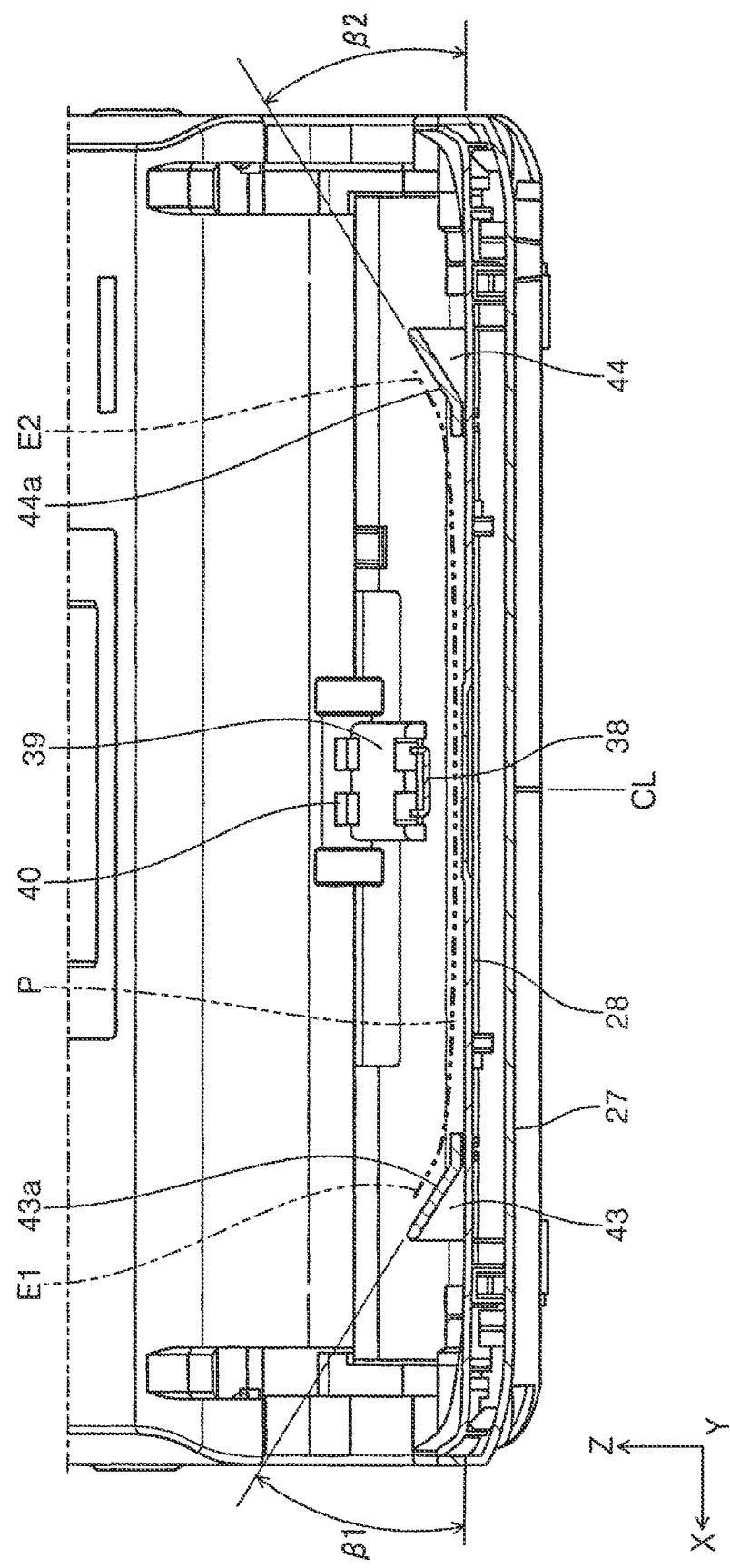
FIG. 17 is a cross-sectional view of the ejection tray with the first ejector attachment and the second ejector attachment fitted thereto.

The first ejector attachment 43 has a receiving surface 43a that becomes higher in +Z direction outward in the width direction as shown in FIG. 17. An angle denoted by reference numeral $\beta 1$ in FIG. 17 is an angle of inclination of the receiving surface 43a with respect to an upper surface of the ejection tray 28. The angle of inclination $\beta 1$ of the receiving surface 43a is constant in a document ejection direction.

Similarly, the second ejector attachment 44 has a receiving surface 44a that becomes higher in +Z direction outward in the width direction as shown in FIG. 17. An angle denoted by reference numeral $\beta 2$ in FIG. 17 is an angle of inclination of the receiving surface 44a with respect to the upper surface of the ejection tray 28. The angle of inclination $\beta 2$ of the receiving surface 44a is constant in the document ejection direction. Further, the angle of inclination $\beta 2$ is the same as the angle of inclination $\beta 1$.

Figure 18:
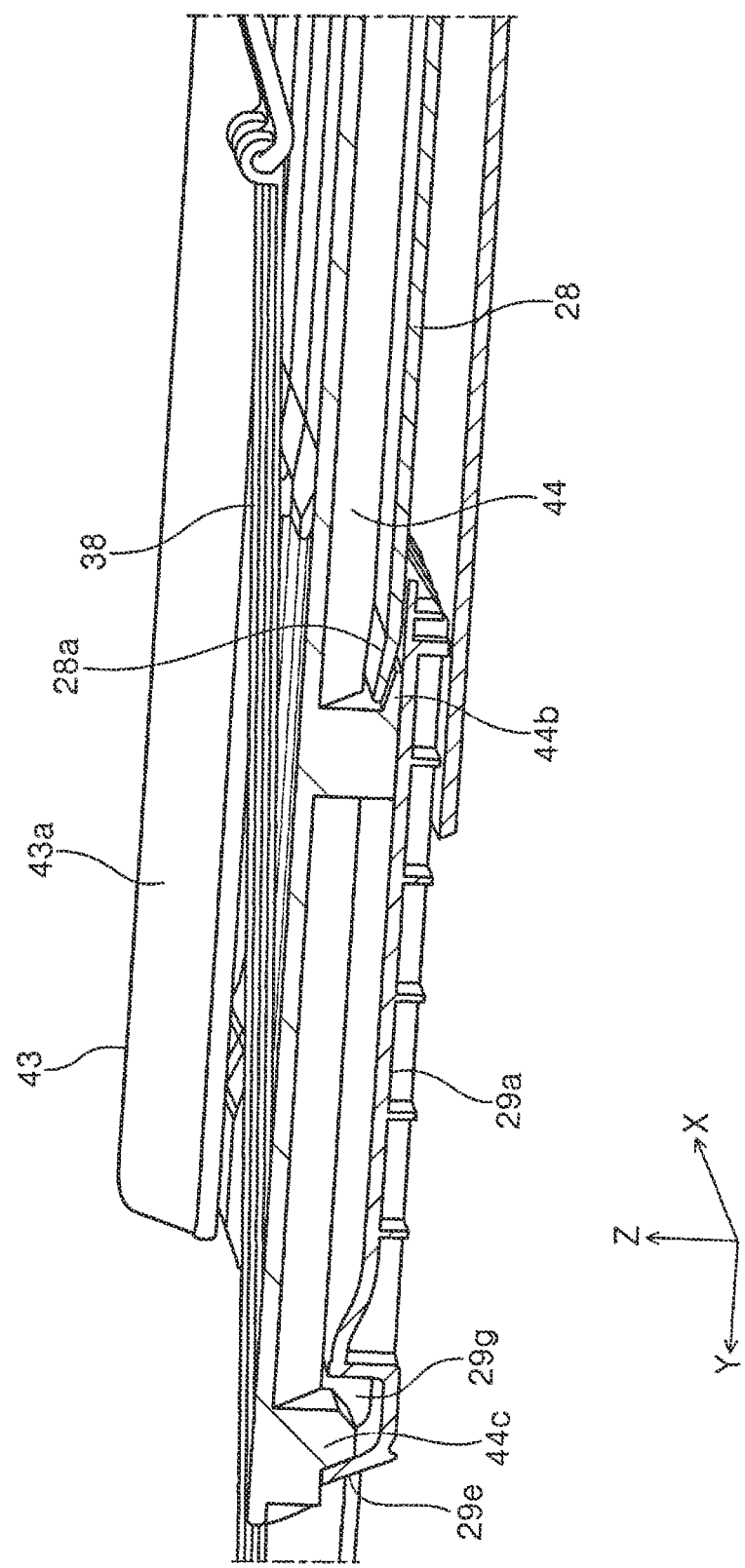
FIG. 18 is a cross-sectional view of the ejection tray, the ejector expansion section, and the second ejector attachment.

FIG. 18 shows a structure of attachment of the second ejector attachment 44 to the ejection tray 28 and the ejector expansion section 29. The second ejector attachment 44 has formed on a lower surface thereof in the −Z direction a first protrusion 44b sticking out in the −Y direction. An end 28a of the ejection tray 28 in the +Y direction is formed to face slightly obliquely upward in the +Y direction, and this allows the first protrusion 44b to get under the end 28a.

Further, the second ejector attachment 44 has formed on a lower surface thereof in the −Z direction a second protrusion 44c sticking out in the −Z direction. The first expansion section 29a, which constitutes the ejector expansion section 29, has a depression 29g, and the second protrusion 44c slots into the depression 29g. The second protrusion 44c comes into contact with a wall 29e of the depression 29g in the +Y direction. This causes the second ejector attachment 44 to be attached to the ejection tray 28 and the first expansion section 29a.

The same applies to a structure of attachment of the first ejector attachment 43 to the ejection tray 28 and the ejector expansion section 29, and the following omits to describe the structure.

As shown in FIG. 17, the receiving surface 43a of the first ejector attachment 43 supports the end E1 in the +X direction of the document from the −Z direction, and the receiving surface 44a of the second ejector attachment 44 supports the end E2 in the −X direction of the document from the −Z direction.

This causes the document mounted on the ejection tray 28 to be formed into a curled shape curving out toward the ejection tray 28 along the width direction. In FIG. 17, reference numeral P denotes the document mounted on the ejection tray 28. The formation of such a curled shape after ejection as well as during feeding enhances the rigidity of the document along the ejection direction after ejection, and makes it possible to improve the alignment of the document on the ejection tray 28.

Further, the ejector attachments are provided on both sides, respectively, in the document width direction This causes the document to be formed into a curled shape that is bilaterally symmetric along the document width direction, and makes it possible to inhibit the document from being skewed during ejection. Even a configuration in which only either the first ejector attachment 43 or the second ejector attachment 44 is provided makes it possible to form the document into a curled shape along the document width direction and enhance the rigidity of the document along the ejection direction.

Further, since the first ejector attachment 43 and the second ejector attachment 44 are configured to be attached and detached, removing them makes it possible to appropriately close the front cover 27 as shown in FIG. 1.

Further, the receiving surfaces 43a and 44a become higher in the +Z direction outward in the document width direction. This causes the document to be formed into a naturally curled shape, and makes it possible to further improve the alignment of the document on the ejection tray 28.

The following describes a pressing section that presses the document against the ejection tray 28. As shown in FIG. 16, an attaching section 40 is detachably provided above the ejection port 18. The attaching section 40 is provided with an intermediate section 39 configured to rotate in a Y-Z plane, and furthermore, the intermediate section 39 is provided with a pressing section 38 configured to rotate in the Y-Z plane. The pressing section 38 is a member extended in the document ejection direction. Moreover, the pressing section 38 gets on top of the document ejected onto the ejection tray 28, and presses the document ejected onto the ejection tray 28 against the ejection tray 28 under the weight of the pressing section 38.

The pressing section 38 presses the document against the ejection tray 28 at a location closer to the center location of the document than the first ejector attachment 43 and the second ejector attachment 44 or, more specifically, presses the document against the ejection tray 28 at the center location CL in the width direction. In this way, the pressing section 38 makes it possible to more surely form the document into a curled shape.

Figure 19:
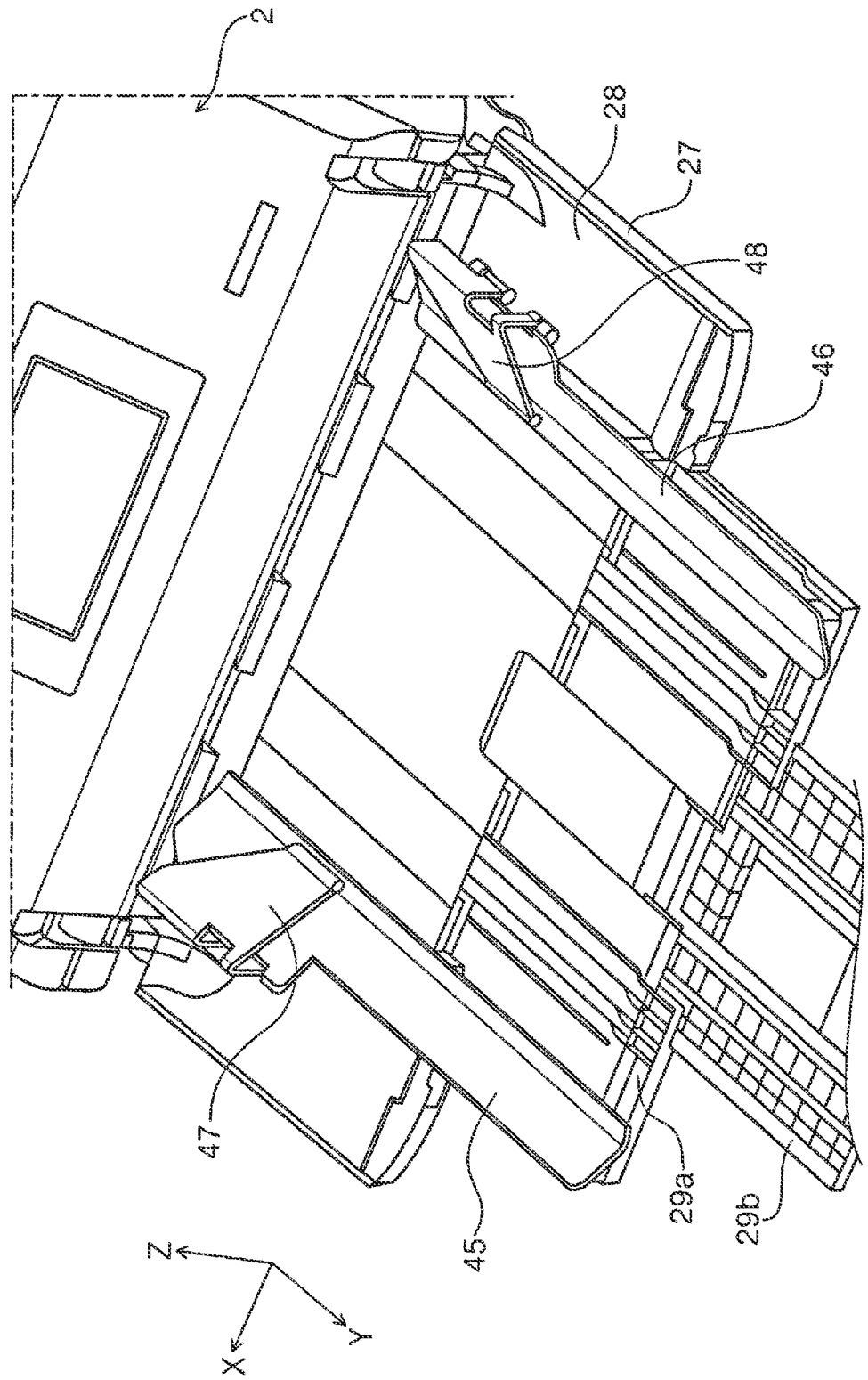
FIG. 19 is a perspective view of the ejection tray with a first ejector attachment and a second ejector attachment according to another embodiment fitted thereto.
Figure 20:
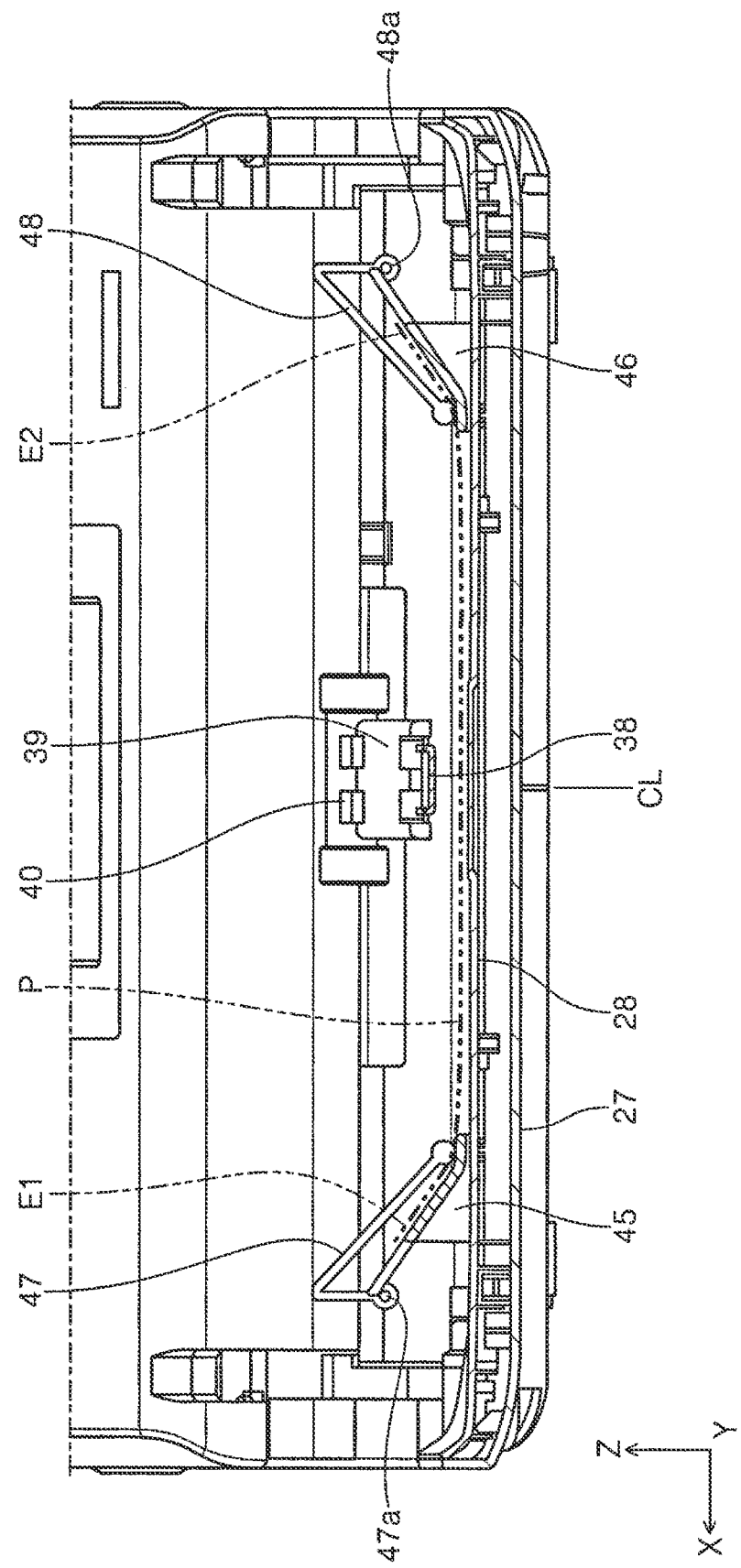
FIG. 20 is a cross-sectional view of the ejection tray, the ejector expansion section, and the second ejector attachment according to the embodiment fitted thereto.

A pressing section that presses the document against the ejection tray 28 may be configured as shown in FIGS. 19 and 20. In FIGS. 19 and 20, reference numeral 47 denotes a first pressing section with which a first ejector attachment 45 is provided, and reference numeral 48 denotes a second pressing section with which a second ejector attachment 46 is provided. The first ejector attachment 45 is the same in basic configuration as the aforementioned first ejector attachment 43 except that the first ejector attachment 45 includes the first pressing section 47. Further, the second ejector attachment 46 is the same in basic configuration as the aforementioned second ejector attachment 44 except that the second ejector attachment 46 includes the second pressing section 48.

The first pressing section 47 is configured to rotate in an X-Z plane with respect to the first ejector attachment 45, and the second pressing section 48 is configured to rotate in the X-Z plane with respect to the second ejector attachment 46. Moreover, the first pressing section 47 and the second pressing section 48 get on top of the ejected document as shown in FIG. 20, and press the document ejected onto the ejection tray 28 against the ejection tray 28 under its own weight. In FIG. 20, reference numeral P denotes the document mounted on the ejection tray 28.

Figure 21:
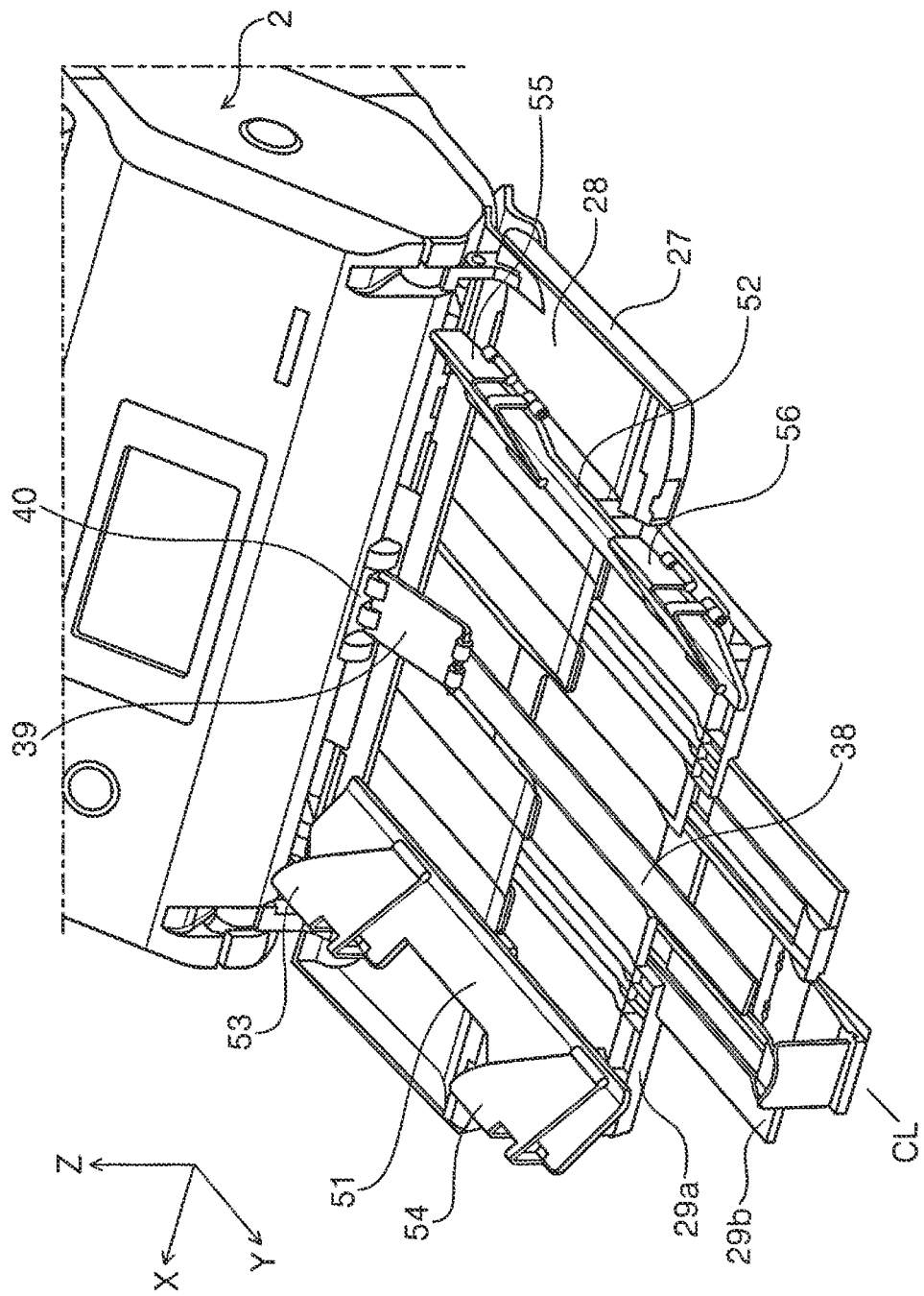
FIG. 21 is a perspective view of the ejection tray with a first ejector attachment and a second ejector attachment according to another embodiment fitted thereto.

In the present embodiment, one first pressing section 47 and one second pressing section 48 are provided in the document ejection direction. Alternatively, as shown in FIG. 21, a plurality of the first pressing sections 47 and a plurality of the second pressing sections 48 may be provided along the document ejection direction. In FIG. 21, reference numeral 53 denotes a first upstream pressing section with which a first ejector attachment 51 is provided, and reference numeral 54 denotes a first downstream pressing section provided downstream in the document ejection direction from the first upstream pressing section 53 in the first ejector attachment 51. Further, reference numeral 55 denotes a second upstream pressing section with which a second ejector attachment 52 is provided, and reference numeral 56 denotes a second downstream pressing section provided downstream in the document ejection direction from the second upstream pressing section 55 in the second ejector attachment 52. The first ejector attachment 51 is the same in basic configuration as the aforementioned first ejector attachment 43 except that the first ejector attachment 51 includes two pressing sections. Further, the second ejector attachment 52 is the same in basic configuration as the aforementioned second ejector attachment 44 except that the second ejector attachment 52 includes two pressing sections.

Further, it is also preferable to set up a configuration so that the height in the +Z direction of a receiving surface of an ejector attachment is greater downstream than upstream in the document ejection direction. The height in the +Z direction of a receiving surface 43b of a first ejector attachment 43A shown in FIG. 22 is greater downstream than upstream. This makes it possible to appropriately form the document into a curled shape while ensuring the capacity of loading of the document by inhibiting the document from being formed into a curled shape near the ejection port 18 through which the document is ejected.

While the document feeding device 9 described above, i.e. the medium feeding device, is applied to the scanner 1 in the foregoing embodiments, it may be applied to a recording apparatus including a recording head that performs recording on a medium.

Further, the present disclosure is not limited to the embodiments described above, and it will be obvious that various changes may be made without departing from the scope of the disclosure recited in the claims and those changes too are encompassed in the scope of the present disclosure.

What is claimed is:
1. A medium feeding device, comprising:
a medium mounting section onto which a medium to be fed is mounted;
a feeding unit that feeds the medium mounted on the medium mounting section; and a supporting member different from the medium mounting section, wherein the supporting member supports an end in a width direction of the medium mounted on the medium mounting section and that supports the end of the medium at a higher position than the medium mounting section in a direction of loading of the medium, the width direction being a direction crossing a feed direction.

2. The medium feeding device according to claim 1, wherein the supporting member is provided on both sides in the width direction.

3. The medium feeding device according to claim 1, wherein a supporting surface of the supporting member that supports the medium becomes higher in the direction of loading of the medium outward in the width direction.

4. The medium feeding device according to claim 3, wherein a height of the supporting surface in the direction of loading from the medium mounting section is greater upstream than downstream in the feed direction.

5. The medium feeding device according to claim 4, further comprising:
a feed roller constituting the feeding unit;
a separating roller that nips the medium with the feed roller and that separates the medium; and
a mounting surface of the medium mounting section onto which the medium is mounted, wherein
when seen from an angle parallel with the width direction, a straight line parallel to the mounting surface and passing through a nip position between the feed roller and the separating roller crosses a downstream part of the supporting surface in the feed direction, and
an upstream part of the supporting surface in the feed direction is at a higher position than the straight line in the direction of loading.

6. The medium feeding device according to claim 4, wherein
the supporting member includes an edge regulating surface that regulates an edge position of the medium in the width direction, and
the edge regulating surface forms a shape that tapers to a center in the width direction toward upstream of the feed direction.

7. The medium feeding device according to claim 1, wherein
an edge guide that regulates an edge position of the medium in the width direction is configured to move in the width direction, and
the supporting member is configured to be attached to and detached from the edge guide.

8. The medium feeding device according to claim 1, further comprising a holding section that presses the medium against the medium mounting section at a location closer to a center location of the medium than the supporting member in the width direction.

9. An image reading apparatus comprising:
a reading unit that reads a surface of a medium; and
the medium feeding device according to claim 1, the medium feeding device being configured to feed the medium toward the reading unit.

10. The image reading apparatus according to claim 9, further comprising:
a medium receiving section that receives the medium ejected after being subjected to reading by the reading unit; and
a receiving member that receives an end in the width direction of the medium ejected onto the medium receiving section and that receives the medium at a higher position than the medium receiving section in a direction of stacking of the medium on the medium receiving section.

11. The image reading apparatus according to claim 10, wherein the receiving member is provided on both sides in the width direction.

12. The image reading apparatus according to claim 10, wherein a receiving surface of the receiving member that receives the medium becomes higher in the direction of stacking outward in the width direction.

13. The image reading apparatus according to claim 12, wherein a height of the receiving surface in the direction of stacking is greater downstream than upstream in a direction of ejection of the medium.

14. The image reading apparatus according to claim 10, further comprising a pressing section that presses the medium against the medium receiving section at a location closer to a center location of the medium than the receiving member in the width direction.

* * * * *